United States Patent
Hashimoto et al.

(10) Patent No.: US 12,261,839 B2
(45) Date of Patent: *Mar. 25, 2025

(54) USER AUTHENTICATION SYSTEM AND PORTABLE TERMINAL

(71) Applicant: MAXELL, LTD., Kyoto (JP)

(72) Inventors: Yasunobu Hashimoto, Kyoto (JP);
Osamu Kawamae, Kyoto (JP);
Kazuhiko Yoshizawa, Kyoto (JP);
Nobuo Masuoka, Kyoto (JP); Hiroshi Shimizu, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/310,260

(22) Filed: May 1, 2023

(65) Prior Publication Data
US 2023/0269247 A1 Aug. 24, 2023

Related U.S. Application Data

(63) Continuation of application No. 16/755,132, filed as application No. PCT/JP2018/001014 on Jan. 16, 2018, now Pat. No. 11,677,744.

(51) Int. Cl.
*H04L 9/40* (2022.01)
*G06F 21/35* (2013.01)
(Continued)

(52) U.S. Cl.
CPC .......... *H04L 63/0853* (2013.01); *G06F 21/35* (2013.01); *H04L 9/3234* (2013.01);
(Continued)

(58) Field of Classification Search
CPC ............... H04L 63/0853; H04L 9/3234; H04L 63/0492; H04L 63/0884; H04L 63/20;
(Continued)

(56) References Cited

U.S. PATENT DOCUMENTS 9,942,222 B1  4/2018  Fenton et al.
10,306,421 B2 * 5/2019  Xu .................. G08C 17/02
(Continued)

FOREIGN PATENT DOCUMENTS

JP  H08-123759 A  5/1996
JP  H10-079982 A  3/1998
(Continued)

OTHER PUBLICATIONS

Zhang, Feng; Kondoro, Aron; Muftic, Sead; "Location-Based Authentication and Authorization Using Smart Phones," 2012 IEEE 11th International Conference on Trust, Security and Privacy in Computing and Communications, Liverpool, UK, 2012, pp. 1285-1292.*

(Continued)

*Primary Examiner* — Victor Lesniewski
(74) *Attorney, Agent, or Firm* — Rimon P.C.

(57) ABSTRACT

A user authentication system includes a main body device and an authentication device. The main body device has an authentication code transmission requesting unit, a verification unit, and an unlocking unit. The authentication code transmission requesting unit generates an authentication code transmission request including a first value, and transmits the authentication code transmission request to the authentication device. The authentication device generates an authentication code in response to the first value in the authentication code transmission request, and transmits the authentication code to the main body device. The verification unit determines that authentication is successful if the authentication code is received from the authentication device. When the verification unit determines that the authentication is successful, the unlocking unit enables a predetermined functionality.

18 Claims, 19 Drawing Sheets

(51) Int. Cl.
*H04L 9/32* (2006.01)
*H04W 12/30* (2021.01)
*H04W 12/33* (2021.01)
*H04W 12/63* (2021.01)
*H04W 12/64* (2021.01)

(52) U.S. Cl.
CPC ...... *H04L 63/0492* (2013.01); *H04L 63/0884* (2013.01); *H04L 63/20* (2013.01); *H04W 12/30* (2021.01); *H04W 12/33* (2021.01); *H04W 12/63* (2021.01); *H04W 12/64* (2021.01)

(58) Field of Classification Search
CPC .. H04L 63/0861; H04W 12/30; H04W 12/33; H04W 12/63; H04W 12/64; H04W 4/80; G06F 21/35; G06F 21/32
See application file for complete search history.

(56) References Cited

U.S. PATENT DOCUMENTS

| | | | |
|---|---|---|---|
| 10,701,067 | B1 | 6/2020 | Ziraknejad et al. |
| 11,704,400 | B2* | 7/2023 | Embrechts ............ H04W 4/025 726/20 |
| 2003/0158815 | A1 | 8/2003 | Yoshida et al. |
| 2005/0048952 | A1 | 3/2005 | Saito et al. |
| 2011/0019824 | A1 | 1/2011 | Sattiraju et al. |
| 2011/0314539 | A1 | 12/2011 | Horton |
| 2012/0015629 | A1 | 1/2012 | Olsen et al. |
| 2012/0021724 | A1 | 1/2012 | Olsen et al. |
| 2015/0039880 | A1 | 2/2015 | Aminzade |
| 2015/0128256 | A1 | 5/2015 | Nakao |
| 2015/0161371 | A1 | 6/2015 | Hoshi et al. |
| 2015/0161377 | A1 | 6/2015 | Rodzevski et al. |
| 2015/0288687 | A1 | 10/2015 | Heshmati et al. |
| 2015/0294306 | A1 | 10/2015 | Grigg et al. |
| 2015/0362977 | A1 | 12/2015 | Doniwa |
| 2015/0379255 | A1 | 12/2015 | Konanur et al. |
| 2016/0174071 | A1 | 6/2016 | Weast |
| 2016/0249174 | A1* | 8/2016 | Patel ........................ A61B 5/01 |
| 2017/0048707 | A1 | 2/2017 | Ortiz et al. |
| 2017/0061424 | A1 | 3/2017 | Dent et al. |
| 2017/0243020 | A1 | 8/2017 | Dhondse et al. |
| 2017/0245314 | A1 | 8/2017 | Ohhira et al. |
| 2017/0324735 | A1 | 11/2017 | Wolf |
| 2017/0346635 | A1 | 11/2017 | Gummeson et al. |
| 2018/0115418 | A1 | 4/2018 | Lakin |
| 2018/0219851 | A1 | 8/2018 | Woo |
| 2018/0288030 | A1 | 10/2018 | Witrisna et al. |
| 2019/0090197 | A1* | 3/2019 | Priness ................ H04W 4/025 |
| 2019/0116495 | A1 | 4/2019 | Stubblefield et al. |
| 2020/0019682 | A1 | 1/2020 | Lee et al. |
| 2020/0220876 | A1 | 7/2020 | Suzuki et al. |

FOREIGN PATENT DOCUMENTS

| | | |
|---|---|---|
| JP | 2003-196566 A | 7/2003 |
| JP | 2004-118456 A | 4/2004 |
| JP | 2005-079975 A | 3/2005 |
| JP | 2005-130008 A | 5/2005 |
| JP | 2006-060392 A | 3/2006 |
| JP | 2008-227758 A | 9/2008 |
| JP | 2013-534796 A | 9/2013 |
| JP | WO2014/147713 A1 | 2/2017 |
| WO | 2018/29324 A1 | 2/2018 |

OTHER PUBLICATIONS

Canlar, Eyup S.; Conti, Mauro; Crispo, Bruno; Di Pietro, Roberto; "Crepuscolo: A collusion resistant privacy preserving location verification system," 2013 International Conference on Risks and Security of Internet and Systems (CRiSIS), La Rochelle, France, 2013, pp. 1-9.*

Notice of Allowance issued Feb. 2, 2023 in U.S. Appl. No. 16/755,132.

Office Action issued Jan. 28, 2022 in U.S. Appl. No. 16/755,132.

Office Action issued Sep. 7, 2022 in U.S. Appl. No. 16/755,132.

Nicholson, A.J.; Corner, M.D ; and Noble, B.D.; "Mobile Device Security Using Transient Authentication," in IEEE Transactions on Mobile Computing, vol. 5, No. 11, pp. 1489-1502, Nov. 2006, doi: 10.1109/TMC.2006.169.

Hu, Pengfei; Pathak, Parth H.; Shen, Yilin; Jin, Hongxia; Mohapatra, Prasant; "PCASA: Proximity Based Continuous and Secure Authentication of Personal Devices," 14th Annual IEEE Int'l Conference on Sensing, Communication, and Networking (SECON), San Diego, CA, USA, 2017, pp. 1-9, doi: 10.1109/SAHCN.2017.7964941.

International Search Report issued in corresponding International Patent Application No. PCT/JP2018/001014, dated Mar. 6, 2018, with English translation.

Hu, Pengfei; Pathak, Parth H.; Shen, Yilin; Jin, Hongxia; Mohapatra, Prasant; "PCASA: Proximity Based Continuous and Secure Authentication of Personal Devices," 14th Annual IEEE Int'l Conference on Sensing, Communication, and Networking (SECON), San Diego, CA, USA, 2017, pp. 1-9, doi: 10.1109/SAHCN.2017.7964941.

* cited by examiner

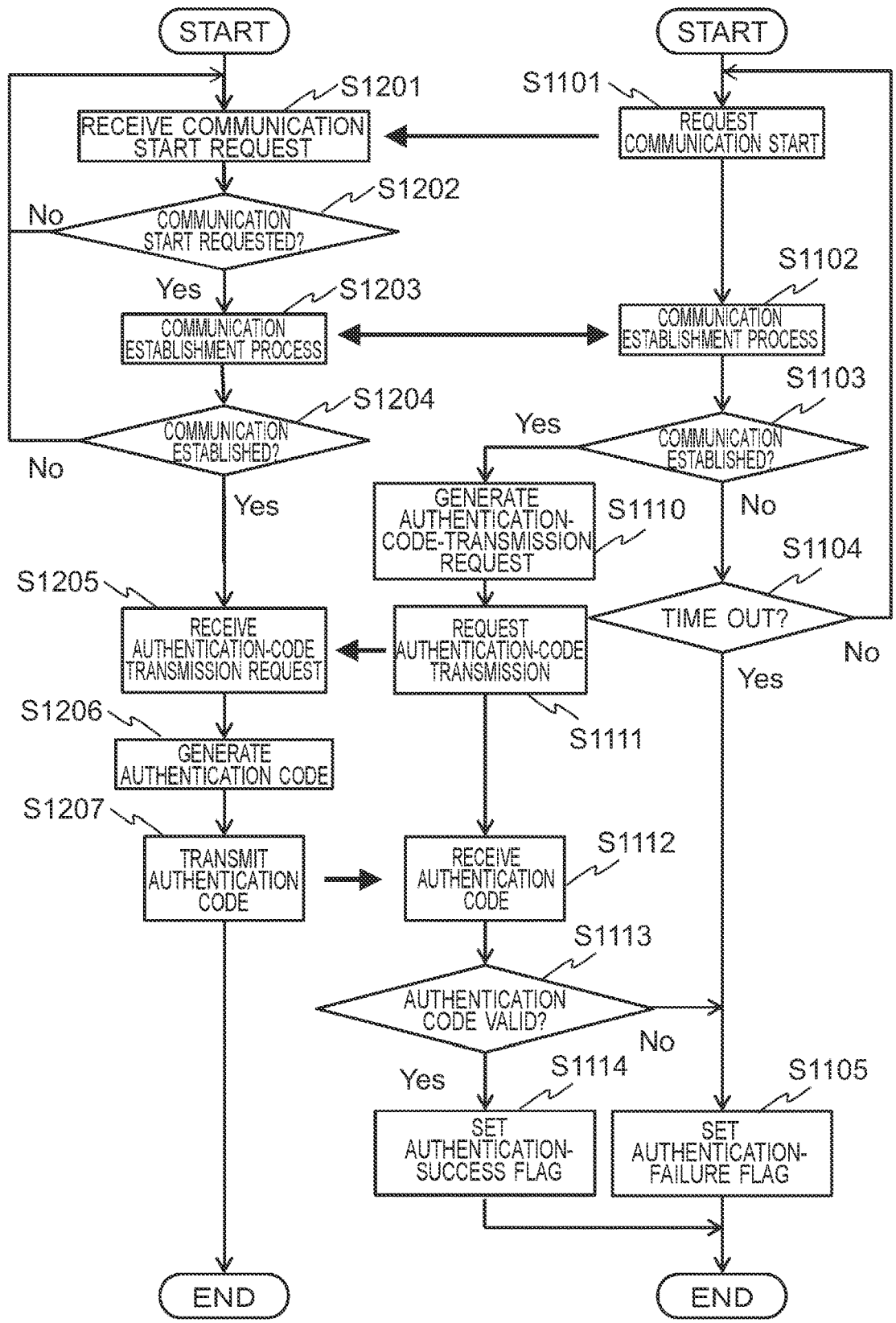

FIG. 6A

| ADDRESS | 1 | 2 | 3 | 4 | 5 | 6 | 7 | 8 | 9 | 0 |
|---|---|---|---|---|---|---|---|---|---|---|
| CODE | a | 8 | 3 | j | f | i | g | 7 | 2 | h |

281a → ADDRESS
281b → CODE
281

| AUTHENTICATION-CODE TRANSMISSION REQUEST | 2 | 5 | 7 | 9 |
|---|---|---|---|---|

| AUTHENTICATION CODE | 8 | f | g | 2 |
|---|---|---|---|---|

| ADDRESS | 1 | 2 | 3 | 4 | 5 | 6 | 7 | 8 | 9 | 10 |
|---|---|---|---|---|---|---|---|---|---|---|
| CODE1 | a | 8 | 3 | j | f | l | g | 7 | 2 | h |
| CODE2 | e | t | f | 6 | 4 | h | 2 | t | g | 9 |
| CODE3 | m | d | h | 3 | 5 | 6 | 1 | j | h | d |

281a — ADDRESS
281b — CODE1
281c — CODE2
281d — CODE3

| AUTHENTICATION-CODE TRANSMISSION REQUEST | 2 | 5 | 7 | 9 |
|---|---|---|---|---|

| AUTHENTICATION CODE | 8 | f | g | 2 |
|---|---|---|---|---|

| AUTHENTICATION CODE | t | 4 | 2 | g |
|---|---|---|---|---|

| TIME | POSITION |
|---|---|
| 2017/11/01 08:00:00 | 35° 24'53" N 138° 51'31" E |
| 2017/11/01 08:01:00 | 35° 24'53" N 138° 51'31" E |
| 2017/11/01 08:02:00 | 35° 24'53" N 138° 51'31" E |
| ⋮ | ⋮ |
| 2017/11/01 10:00:10 | 35° 25'54" N 138° 51'30" E |
| ⋮ | ⋮ |

| POSITION | AUTHENTICATION-SUCCESS COUNT |
|---|---|
| 35° 28'29" N 138° 53'14" E | 23 |
| 35° 28'41" N 138° 53'22" E | 42 |
| 35° 27'40" N 138° 54'17" E | 12 |
| 35° 29'01" N 138° 54'36" E | 3 |
| 35° 28'55" N 138° 56'43" E | 1 |
| 35° 28'21" N 138° 59'03" E | 2 |

284c / 284d 284e (brackets first three rows)

USER AUTHENTICATION SYSTEM AND PORTABLE TERMINAL

This application is a continuation of U.S. patent application Ser. No. 16/755,132, filed on Apr. 9, 2020, which in turn is the U.S. National Phase under 35 U.S.C. § 371 of International Application No. PCT/JP2018/001014, filed Jan. 16, 2018, the disclosure of which the Application is incorporated by reference herein.

TECHNICAL FIELD

The present invention relates to a user authentication technology for an information processing apparatus such as a portable terminal. In particular, the present invention relates to a user authentication technology using an auxiliary authentication apparatus.

BACKGROUND ART

Technologies for protecting security of information processing apparatuses such as portable terminals by limiting use of them by others include ones that use auxiliary authentication apparatuses other than the portable terminals. For example, Patent Literature 1 discloses a technology for "a portable terminal apparatus that executes wireless communication with another wireless communication apparatus, the portable terminal apparatus including storage means for storing identification information of a preregistered particular wireless communication apparatus; wireless communication means for receiving a signal transmitted by another wireless communication apparatus; and control means, in which portable terminal apparatus the control means acquires identification information included in a signal received by the wireless communication means, and if the identification information matches identification information stored in the storage means, enables a particular functionality of the portable terminal apparatus (extracted from the abstract).

CITATION LIST

Patent Literature

PATENT LITERATURE 1: Japanese Patent Application Laid-Open No. 2005-130008

SUMMARY OF INVENTION

Technical Problem

According to the technology disclosed in Patent Literature 1, it is possible to prevent the risk of use of the portable terminal apparatus by others who do not have the particular wireless communication apparatus, without performing cumbersome operation. However, information for authentication such as the identification information of the particular wireless communication apparatus mentioned above, is transmitted and received wirelessly. Interception, wiretapping, and the like of the information are not taken into consideration.

The present invention is made in view of the circumstances described above, and an object of the present invention is to provide a technology that improves the safety of performing user authentication for a portable terminal by using an auxiliary authentication apparatus.

Solution to Problem

The present invention provides a user authentication system including a main body device; and an authentication device that communicates with the main body device; authenticating a user of the main body device. In the user authentication system, the main body device includes: an authentication code transmission requesting unit that generates an authentication code transmission request including a first value selected for each instance of transmission, and transmits the authentication code transmission request to the authentication device; a verification unit that decides that the authentication is successful if an authentication code transmitted from the authentication device in response to the authentication code transmission request is included in a verification authentication code generated in response to the first value; and an unlocking unit that enables a predetermined functionality if the verification unit decides that the authentication is successful, and the authentication device includes an authentication code reply unit that generates the authentication code in response to the first value included in the authentication code transmission request, and transmits the authentication code as a reply to the main body device.

Advantageous Effects of Invention

According to the present invention, the safety of performing user authentication for a portable terminal by using an auxiliary authentication apparatus improves. Problems, configurations and effects other than those described above are made clear by the following explanations of embodiments.

BRIEF DESCRIPTION OF DRAWINGS

FIG. 5 is a flowchart of a user authentication process in the first embodiment.

FIG. 6A is an explanatory diagram for explaining one example of authentication source information in the first embodiment; FIG. 6B is an explanatory diagram for explaining one example of an authentication code transmission request in the first embodiment; and FIG. 6C is an explanatory diagram for explaining one example of an authentication code in the first embodiment.

FIG. 9A is an explanatory diagram for explaining one example of authentication source information in the second embodiment; FIG. 9B is an explanatory diagram for explaining one example of an authentication code transmission request in the second embodiment; and FIGS. 9C and 9D are explanatory diagrams for explaining one example of an authentication code in the second embodiment.

FIG. 13A is an explanatory diagram for explaining one example of an activity history in the third embodiment; and FIG. 13B is an explanatory diagram for explaining one example of a normal activity area in a modification of the third embodiment.

DESCRIPTION OF EMBODIMENT

Hereinafter, embodiments of the present invention are explained with reference to the drawings. Hereinafter, in the present specification, components with the same functionalities are given the same reference signs unless otherwise noted particularly, and repetitive explanations are omitted.

First Embodiment

Figure 1:
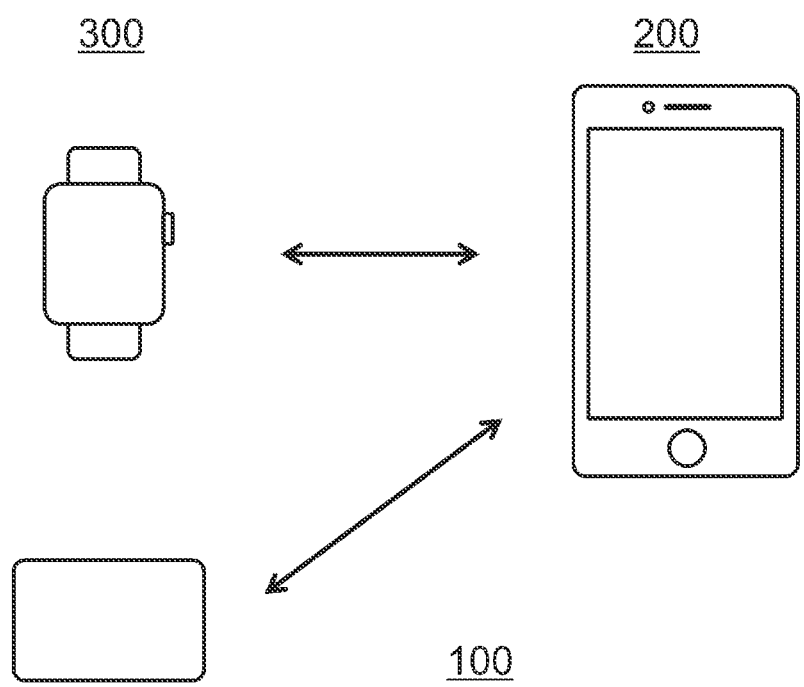
FIG. 1 is a figure illustrating an entire user authentication system in a first embodiment.

First, the overview of a first embodiment of the present invention is explained. FIG. 1 is a figure for explaining the overview of a user authentication system 100 in the present embodiment.

The user authentication system 100 includes a main body device 200 and an authentication device 300. The authentication device 300 is an auxiliary authentication apparatus used for authentication of a user of the main body device 200. That is, in the present embodiment, a particular functionality of the main body device 200 can be used only by a user who is holding the authentication device 300.

If the authentication device 300, which is typically such an auxiliary authentication apparatus, is used, transmission and reception of an authentication code to and from the main body device 200 is performed through wireless communication. Then, the safety at the time of the communication is not considered. Accordingly, once the authentication code is stolen by interception, even a person who is not the owner of the authentication device 300 can use a functionality of the main body device 200. In the present embodiment, in order to avoid this, the authentication code transmitted from the authentication device 300 to the main body device 200 is changed every time, confidentiality of the authentication code is enhanced, and the safety at the time of transmission and reception is enhanced.

Hereinafter, the user authentication system 100 in the present embodiment to realize the process described above is explained.

[Main Body Device]

First, the main body device 200 is explained. The main body device 200 is an information processing apparatus having a wireless communication functionality, and an information processing functionality. For example, the main body device is a portable phone, a smartphone, a tablet terminal, a wearable terminal such as a watch or a head mount display, a feature phone, and other portable digital equipment.

Figure 2:
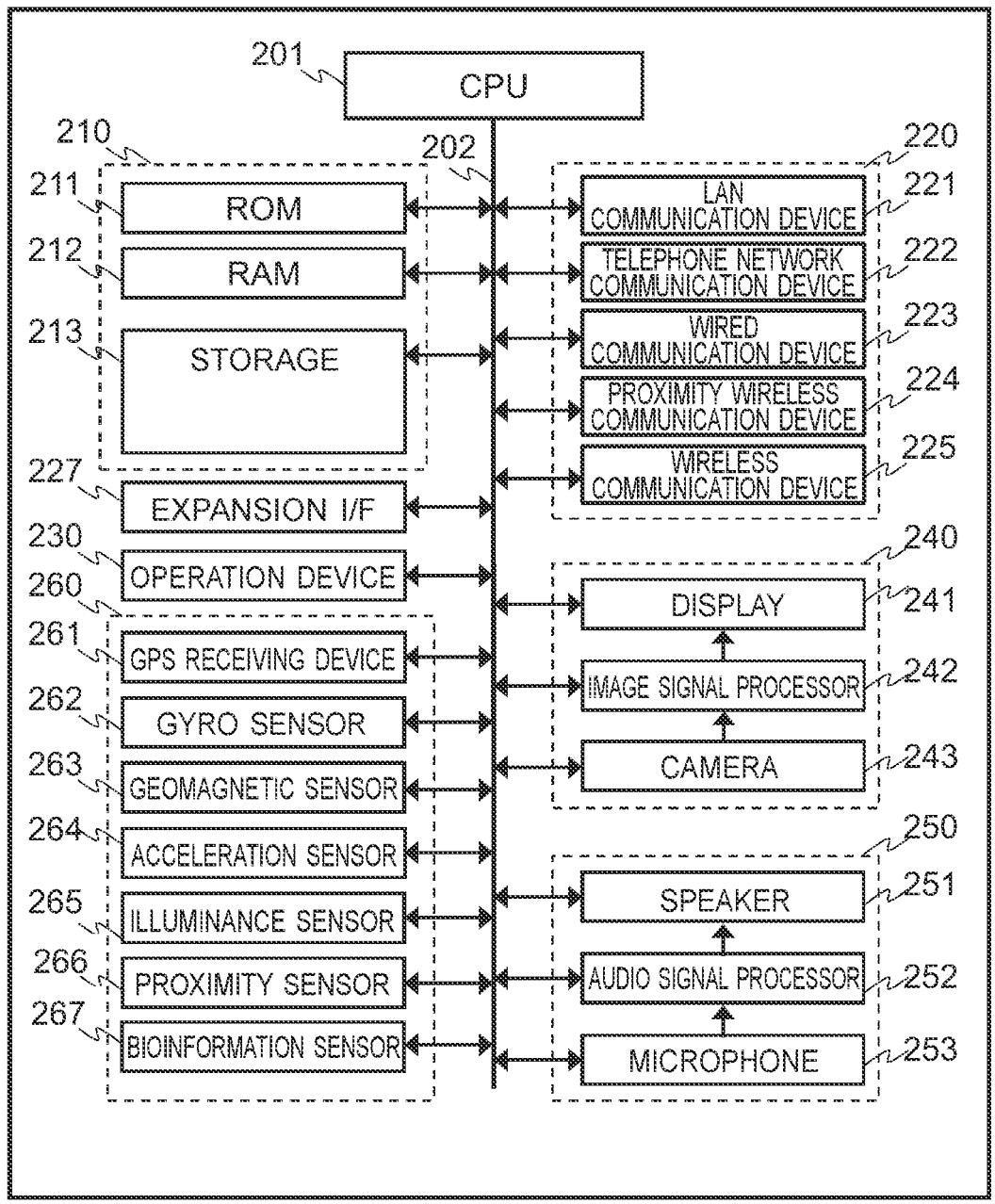
FIG. 2 is a hardware configuration diagram of a main body device in the first embodiment.

Hardware configurations of the main body device 200 are illustrated in FIG. 2. As illustrated in this drawing, the main body device 200 includes a CPU (Central Processing Unit) 201, a system bus 202, a storage apparatus 210, a communication processing device 220, an expansion I/F 227, an operation device 230, a video processor 240, an audio processor 250 and a sensor 260.

The CPU 201 is a microprocessor unit that controls the entire main body device 200. The system bus 202 is a data communication path for performing data transmission/reception between the CPU 201 and operation blocks in the main body device 200.

The storage apparatus 210 includes a ROM (Read Only Memory) 211, a RAM (Random Access Memory) 212, and a storage 213.

The ROM 211 is a memory storing a basic operating program such as an operating system, and other operating programs. As the ROM 211, for example, a rewritable ROM like an EEPROM (Electrically Erasable and Programmable Read Only Memory) or a flash ROM is used.

The storage 213 stores operating programs and operation set values of the main body device 200, and different types of programs and different types of data that are required for realizing respective functionalities of the present embodiment.

The storage 213 holds information that is stored even in a state where the main body device 200 is not being supplied with power from the outside. Because of this, for example, a device such as a flash ROM, an SSD (Solid State Drive) or an HDD (Hard Disk Drive) is used as the storage 213.

The RAM 212 is a work area to be used at the time of execution of the basic operating program or other operating programs.

The ROM 211 and the RAM 212 may be configured as an integrated component with the CPU 201. In addition, the ROM 211 may be configured not as an independent component like the one illustrated in FIG. 2, but a partial storage area in the storage 213 may be used as the ROM 211. That is, a partial area of the storage 213 may alternatively serve the entire functionality of or part of the functionality of the ROM 211.

Note that the respective operating programs stored in the ROM 211 and the storage 213 can be updated or have an expanded functionality by processes of downloading from distribution servers on a network, for example.

The communication processing device 220 includes a LAN (Local Area Network) communication device 221, a telephone network communication device 222, a wired communication device 223, a proximity wireless communication device 224, and a wireless communication device 225.

The LAN communication device 221 is connected to a network via an access point (AP) apparatus through wireless connection established by Wi-Fi (registered trademark) and the like, and performs data transmission/reception to and from another apparatus on the network.

The telephone network communication device 222 is used for making calls and performing data transmission/reception through wireless communication with a base station in a mobile telephone communication network.

The wired communication device 223 performs data transmission/reception to and from another apparatus near the main body device 200 by wired connection means such as a USB (Universal Serial Bus).

The proximity wireless communication device 224 performs data transmission/reception to and from another apparatus including a proximity wireless communication device through wireless communication. The proximity wireless communication device 224 is an I/F for near field communication (NFC), for example, and realizes bidirectional communication with equipment equipped with an NFC chip at very short distances of about several centimeters to one meter. For example, the proximity wireless communication device 224 supports services that use a contactless IC chip such as electronic money mounted on the main body device 200.

The wireless communication device 225 performs data transmission/reception to and from another apparatus including a wireless communication device through wireless communication. For example, the wireless communication device 225 realizes simple information exchange by using radio waves with information equipment that is at a distance of about several meters to several dozen meters through Bluetooth (registered trademark) and the like.

The LAN communication device 221, the telephone network communication device 222, the wired communication device 223, the proximity wireless communication device 224, and the wireless communication device 225 each include an encoding circuit, a decoding circuit, an antenna, and the like. In addition, the communication processing device 220 may further include a communication device that realizes infrared communication or another communication device.

The expansion I/F 227 is an interface group for expanding the functionality of the main body device 200. In the present embodiment, the expansion I/F 227 includes a video/audio I/F, an operation equipment I/F, a memory I/F, and the like. The video/audio I/F is used for performing input of video signals/audio signals from external video/audio output equipment, output of video signals/audio signals to external video/audio input equipment, and the like. External operation equipment such as a keyboard is connected via the operation equipment I/F. The memory I/F is used for performing data transmission/reception by connection thereto of a memory card and other memory media.

The operation device 230 is used for performing input of an operation instruction to the main body device 200. In the present embodiment, the operation device 230 includes a touch panel arranged to overlap a display 241, and operation keys which are aligned button switches. Note that the operation device 230 may include only either one of them. In addition, operation of the main body device 200 may be performed by using a keyboard or the like connected to the expansion I/F 227. In addition, operation of the main body device 200 may be performed by using a separate unit of portable information terminal equipment connected through wired communication or wireless communication. In addition, the touch panel functionality may be provided to the display 241.

The video processor 240 includes the display 241, an image signal processor 242 and a camera 243.

The display 241 is a display device such as a liquid crystal panel for example, displays image data processed at the image signal processor 242, and provides the image data to a user of the main body device 200. The image signal processor 242 includes a video RAM which is not illustrated in the figure, and the display 241 is driven on the basis of image data input to the video RAM. In addition, the image signal processor 242 performs format conversion, a superimposition process of a menu and other OSD (On-Screen Display) signals, and the like, as necessary. The camera 243 is an image capturing apparatus that uses an electronic device such as a CCD (Charge-Coupled Device) or a CMOS (Complementary Metal Oxide Semiconductor) sensor to convert light input through a lens into electronic signals, to thereby capture images of the space around it or a target object as image data.

The audio processor 250 includes a speaker 251, an audio signal processor 252, and a microphone 253. The speaker 251 provides audio signals processed at the audio signal processor 252 to the user of the main body device 200. The microphone 253 converts the voice of the user and the like into audio data, and inputs the audio data.

The sensor 260 is a sensor group for detecting the state of the main body device 200. In the present embodiment, the sensor 260 includes, for example, a GPS (Global Positioning System) receiving device 261, a gyro sensor 262, a geomagnetic sensor 263, an acceleration sensor 264, an illuminance sensor 265, a proximity sensor 266, and a bioinformation sensor 267.

With this group of sensors, the position, inclination, direction, motion, ambient brightness, user bioinformation, and the like of the main body device 200 are detected. In addition, the main body device 200 may further include other sensors like pressure sensors such as an air pressure sensor. Note that position information is acquired by the GPS receiving device 261. At places where GPS radio waves are hard to reach or the like, the position information may be acquired by using position information of a Wi-Fi AP apparatus by the LAN communication device 221, and similarly the position information may be acquired by a position information acquisition method by using position information of a base station, and propagation delays of telephone communication radio waves by the telephone network communication device 222. In addition, this group of sensors need not be necessarily provided entirely.

Note that the configuration example of the main body device 200 illustrated in FIG. 2 also includes a large number of configurations that are not essential for the present embodiment, and the effects of the present embodiment are not impaired even with a configuration not provided with those configurations. In addition, configurations that are not illustrated such as a digital broadcast reception functionality or an electronic money settlement functionality may further be added.

[Functional Configurations of Main Body Device]

Figure 3:
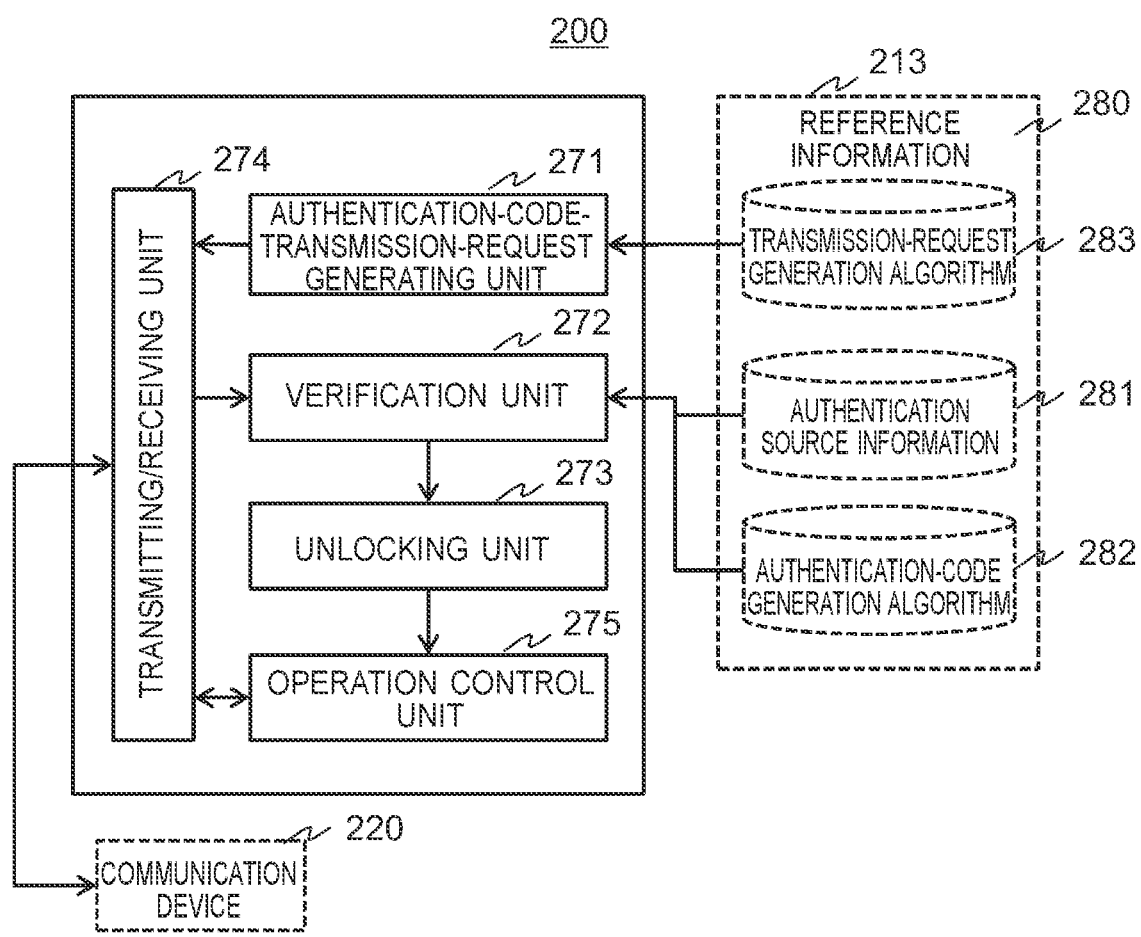
FIG. 3 is a functional block diagram of the main body device in the first embodiment.

A functionality realized by the main body device 200 is explained by using FIG. 3. As mentioned above, the main body device 200 of the present embodiment requests the authentication device to perform user authentication when a user tries to execute a predetermined functionality, and if authentication is successful, makes it possible to execute the functionality.

In order to realize this, the main body device 200 includes an authentication code transmission request generating unit 271, a verification unit 272, an unlocking unit 273, a transmitting/receiving unit 274, and an operation control unit 275.

Note that these functionalities are realized by the CPU 201 copying a program stored in the ROM 211 to the RAM 212 as an execution program 291, and executing the execution program 291. Because of this, in FIG. 3, a functionality to be realized by the stored program is illustrated in the ROM 211.

In addition, as reference information 280, authentication source information 281, an authentication code generation algorithm 282, and a transmission request generation algorithm 283 are stored in the storage 213 (main body storage unit). These pieces of data are stored in advance in the storage 213. When the functionalities described above are to be executed, the CPU 201 stores these pieces of data in a temporary storage area 292 of the RAM 212, and uses them. In addition, data to be generated in the middle of execution of each program stored in the ROM 211, data to be obtained as a result of the execution, and the like are stored in the temporary storage area of the RAM 212.

The transmitting/receiving unit 274 controls data transmission/reception to and from an external apparatus via the communication processing device 220 or, for example, the USB I/F in the expansion I/F 227.

The authentication code transmission request generating unit 271 generates an authentication code transmission request for requesting the authentication device 300 to transmit an authentication code. The authentication code transmission request is generated for example if an execution instruction for a functionality that is set as a functionality that requires authentication (authentication required functionality) is received and in other cases, prior to the execution. The authentication code transmission request is generated in accordance with the transmission request generation algorithm 283. At this time, the authentication code is generated such that the authentication code transmitted as a reply differs for each request.

The generated authentication code transmission request is transmitted to the authentication device 300 via the transmitting/receiving unit 274. That is, the authentication code transmission request generating unit 271 and the transmitting/receiving unit 274 function as an authentication code transmission requesting unit.

The verification unit 272 checks the validity of the authentication code transmitted as a reply from the authentication device 300 in response to the authentication code transmission request. In the present embodiment, the authentication code transmission request, the authentication source information 281, and the authentication code generation algorithm 282 are used to generate a verification authentication code. Then, the generated verification authentication code is compared with (verified against) the authentication code transmitted as a reply to judge its validity. For example, if the authentication code transmitted from the authentication device 300 matches the verification authentication code, it is decided that the authentication is successful.

If the verification unit 272 judges that the authentication code is valid, the unlocking unit 273 makes it possible to execute (enable) the authentication required functionality.

The operation control unit 275 controls each unit of the main body device 200 such that the authentication required functionality, which the unlocking unit 273 has permitted to execute, is realized. In addition, the operation control unit 275 functions also as a receiving unit that receives different types of instructions through the operation device 230.

[Hardware Configurations of Authentication Device]

Next, the authentication device 300 is explained. The authentication device 300 is held by a user who is permitted to operate the main body device 200, generates an authentication code in response to a request from the main body device 200, and transmits the authentication code as a reply.

Figure 4A:
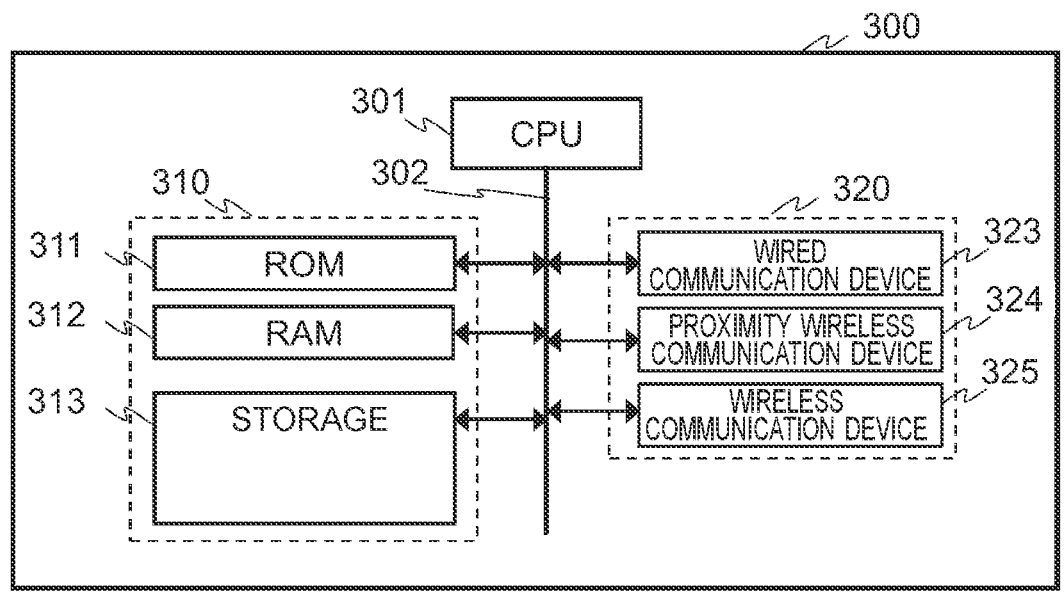
FIG. 4A is a hardware configuration diagram of an authentication device in the first embodiment.

Hardware configurations of the authentication device 300 to realize this are illustrated in FIG. 4A. As illustrated in this drawing, the authentication device 300 includes a CPU 301, a system bus 302, a storage apparatus 310, and a communication processing device 320.

The CPU 301 is a microprocessor unit that controls operation of the entire authentication device 300. The system bus 302 is a data communication path for performing data transmission/reception between the CPU 301 and operation blocks in the authentication device 300.

The storage apparatus 310 includes a ROM 311, a RAM 312, and a storage 313. These have basically the same functionalities and configurations as the configurations with the same names in the main body device 200.

The communication processing device 320 includes a wired communication device 323, a proximity wireless communication device 324, and a wireless communication device 325. These also have basically the same functionalities and configurations as the configurations with the same names in the main body device 200.

Note that in other respects, the authentication device 300 may include the same configurations as those in the main body device 200. For example, the authentication device 300 may further include an expansion I/F 227. In addition, the authentication device 300 may include all of the hardware configurations of the main body device 200.

[Functional Configurations of Authentication Device]

Figure 4B:
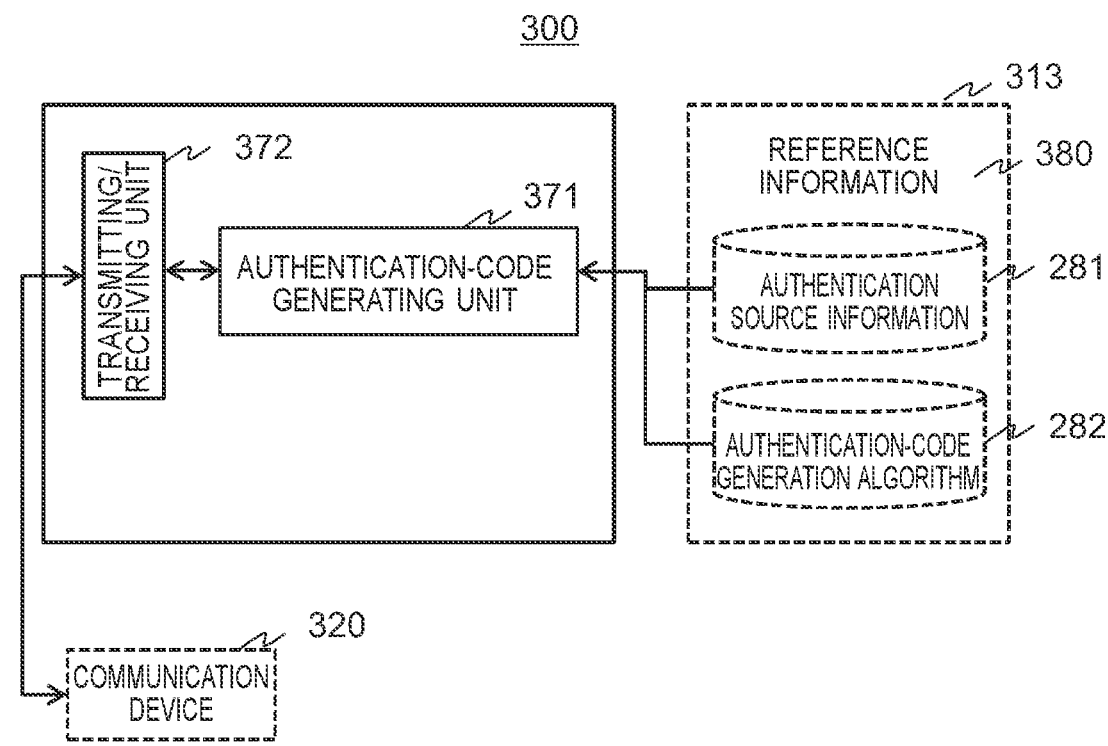
FIG. 4B is a functional block diagram of the authentication device in the first embodiment.

Next, a functionality realized by the authentication device 300 is explained by using FIG. 4B. As mentioned above, the authentication device 300 of the present embodiment transmits an authentication code as a reply in response to a request from the main body device 200.

In order to realize this, the authentication device 300 includes an authentication code generating unit 371 and a transmitting/receiving unit 372. These functionalities are realized by the CPU 301 copying a program stored in the ROM 311 to the RAM 312 as an execution program 391, and executing the execution program 391.

In addition, as reference information 380, authentication source information 281 and an authentication code generation algorithm 282 are stored in the storage 313 (authentication storage unit). These pieces of data are duplicates of the pieces of data with the same names in the main body device 200.

When the functionalities described above are to be executed, the CPU 301 stores these pieces of data in a temporary storage area 392 of the RAM 312, and uses the pieces of data. In addition, data to be generated in the middle of execution of each program stored in the ROM 311, data to be obtained as a result of the execution, and the like are stored in the temporary storage area of the RAM 312.

The transmitting/receiving unit 372 controls data transmission/reception to and from an external apparatus via the communication processing device 320.

In response to reception of an authentication code transmission request from the main body device 200 via the transmitting/receiving unit 372, the authentication code generating unit 371 generates an authentication code. The authentication code is generated by using information included in the authentication code transmission request, the authentication source information 281, and the authentication code generation algorithm 282. The generation manner is the same as the manner used by the verification unit 272 of the main body device 200 to generate a verification authentication code.

The generated authentication code is transmitted as a reply to the main body device 200 via the transmitting/ receiving unit 372. That is, the authentication code generating unit 371 and the transmitting/receiving unit 372 function as an authentication code reply unit.

[Flow of User Authentication Process]

Next, the flow of a user authentication process in the present embodiment is explained. FIG. 5 illustrates the process flow of the user authentication process in the present embodiment. The present process is triggered by reception of an execution instruction for the authentication required functionality mentioned before, for example.

First, the transmitting/receiving unit 274 of the main body device 200 makes a communication start request to the authentication device 300 (Step S1101).

In response to reception of the communication start request (Steps S1201 and S1202), the transmitting/receiving unit 372 of the authentication device 300 performs a communication establishment process between the authentication device 300 and the requester apparatus (main body device 200) (Steps S1203 and S1102).

Communication establishment may be realized, for example, by a manner of performing polling continuously from the side of the authentication device 300, detecting the main body device 200 that has entered a predetermined area, and establishing bidirectional communication.

On the side of the authentication device 300, the authentication device 300 keeps waiting until communication is established (Step S1204). On the other hand, on the side of the main body device 200, if communication is not established after transmission of the communication start request (Step S1103), the flow returns to Step S1101 if the elapsed time is equal to or shorter than a predetermined length of time, and the communication start request is made again.

On the other hand, if the predetermined length of time has elapsed, the process times out (Step S1104), and the verification unit 272 judges that the authentication failed. In this case, the verification unit 272 sets an authentication failure flag (Step S1105), and ends the process.

In response to establishment of bidirectional communication (Steps S1204 and S1103), first, the authentication code transmission request generating unit 271 of the main body device 200 generates an authentication code transmission request (Step S1110), and transmits the authentication code transmission request to the authentication device 300 (Step S1111).

On the side of the authentication device 300, in response to reception of the authentication code transmission request by the transmitting/receiving unit 372 (Step S1205), the authentication code generating unit 371 generates an authentication code (Step S1206). Then, the transmitting/receiving unit 372 transmits the generated authentication code to the main body device 200 (Step S1207).

In response to reception of the authentication code by the transmitting/receiving unit 274 of the main body device 200 (Step S1112), the verification unit 272 judges its validity (Step S1113). Here, as mentioned above, it is judged whether the authentication code matches the verification authentication code generated in advance. If they match, the verification unit 272 judges that the authentication is successful, sets an authentication success flag (Step S1114), and ends the process.

On the other hand, if they do not match, the verification unit 272 judges that the authentication failed, and proceeds to Step S1105.

Note that the authentication failure flag and the authentication success flag are stored in the temporary storage area 292.

In addition, if the authentication success flag is set after the user authentication process mentioned above ended, the unlocking unit 273 unlocks the authentication required functionality instructed to execute, and makes it possible to use the authentication required functionality. Specifically, an instruction from a user for the functionality is accepted.

Note that in the user authentication process in the present embodiment, data transmission/reception between the main body device 200 and the authentication device 300 is performed through wireless communication by using the wireless communication devices 225 and 325, for example.

Next, the authentication code transmission request generation process at Step S1110 described above and the authentication code generation process at Step S1206 are explained.

First, the authentication source information 281, the authentication code generation algorithm 282, and the transmission request generation algorithm 283 used at this time are explained.

The authentication source information 281 in the present embodiment includes first values, and second values different from the first values that are stored in association with each other. If a first value is designated, a second value registered in association with the first value is transmitted as a reply. At this time, a different first value is designated for each authentication code transmission request. Thereby, a different authentication code is transmitted as a reply at each instance.

FIG. 6A illustrates one example of the authentication source information 281 in the present embodiment. As illustrated in this drawing, the authentication source information 281 includes addresses 281a which are first values, and codes 281b which are second values corresponding to the addresses 281a. In the present embodiment, an address 281a is designated in the authentication code transmission request. Then, a code 281b registered in association with the designated address 281a is used as the authentication code.

In the present embodiment, the main body device 200 transmits one or more addresses 281a as an authentication code transmission request 285 as illustrated in FIG. 6B. Then, the authentication device 300 generates, as an authentication code 286, a corresponding code 281b as illustrated in FIG. 6C.

The transmission request generation algorithm 283 defines a manner (rule) of generating information to be transmitted as the authentication code transmission request 285. In the present embodiment, a manner of determining the addresses 281a in the authentication source information 281 to be included in the authentication code transmission request 285 is defined. For example, the value of the last digit of a time indicated by a clock at the time of generation of the authentication code transmission request is used, a random number generated by a random number generator and the like is used, or another type of value is used. The random number generator may be provided to the main body device 200. Note that if a plurality of addresses 281a are included in the authentication code transmission request 285 as illustrated in FIG. 6B, their order may be specified as well.

The transmission request generation algorithm 283 is not limited to the one described above. Every time an authentication code transmission request is generated, a different address 281a or a different set of addresses 281a may be set. In addition, the transmission request generation algorithm 283 may be set and changed by a user as desired.

The authentication code transmission request generating unit 271 specifies addresses 281a in the authentication source information 281 in accordance with the transmission request generation algorithm 283. Then, the authentication code transmission request generating unit 271 uses the specified addresses 281*a* to generate the authentication code transmission request 285. In addition, information of the specified addresses 281*a* is output also to the verification unit 272.

The authentication code generation algorithm 282 defines a manner (rule) of generating the authentication code 286. In the present embodiment, a process of extracting a code registered in the authentication source information 281 in association with the addresses 281*a* included in the authentication code transmission request 285 and generating the code as an authentication code is registered.

The authentication code generating unit 371 extracts, from the authentication source information 281, the code corresponding to the addresses 281*a* included in the authentication code transmission request 285 in accordance with the authentication code generation algorithm 282, and generates the code as the authentication code 286.

For example, it is assumed that, if the authentication source information 281 illustrated in FIG. 6A is used, 2, 5, 7, and 9 are designated as the addresses 281*a* in the authentication code transmission request 285 as illustrated in FIG. 6B. In this case, as illustrated in FIG. 6C, the authentication code 286 including 8, f, g and 2 is generated, and transmitted as a reply.

As explained above, the user authentication system 100 in the present embodiment includes the main body device 200 and the authentication device 300. Then, the main body device 200 includes: the authentication code transmission requesting unit that generates an authentication code transmission request including a predetermined first value and transmits the authentication code transmission request to the authentication device 300; the verification unit 272 that generates a verification authentication code in response to the first value included in the authentication code transmission request, and if the authentication code transmitted from the authentication device 300 in response to the authentication code transmission request is included in the generated verification authentication code, decides that the authentication is successful; and the unlocking unit 273 that enables a predetermined functionality if the verification unit 272 decides that the authentication is successful. In addition, the authentication device 300 generates the authentication code in response to the first value included in the authentication code transmission request, and transmits the authentication code as a reply to the main body device 200.

At this time, the main body device 200 and the authentication device 300 share the authentication source information 281 that have a plurality of sets each including a first value and a second value associated with the first value, and the authentication code generation algorithm 282 for generating an authentication code from the authentication source information 281. Then, the authentication code transmission requesting unit selects first values from the authentication source information 281 in accordance with a predetermined rule, and the authentication code reply unit generates, as an authentication code, second values stored in the authentication source information 281 in association with the transmitted first values.

In this manner, according to the present embodiment, a different authentication code is transmitted as a reply every time an authentication code is requested. Because of this, even if an authentication code transmitted as a reply is stolen by interception or wiretapping, the authentication code is not used at the next time of authentication. Accordingly, high safety can be attained when authentication is performed at a portable terminal (main body device 200) by using an auxiliary authentication apparatus (authentication device 300).

<Modifications>

Note that the authentication code generation algorithm 282 may be a function. In this case, the authentication source information 281 may not be provided. For example, the authentication code transmission request generating unit 271 makes a variable of the function included in an authentication code transmission request, and transmits the authentication code transmission request. The variable is generated in accordance with the transmission request generation algorithm 283, for example.

In this case, the verification unit 272 uses, as the verification authentication code, a value given by the function in response to the variable. In addition, the authentication code generating unit 371 also transmits, as a reply as the authentication code 286, a value given by the function in response to the transmitted variable.

In addition, a functionality of a token or the like that outputs a different authentication code for each output may be used for generation of the authentication code. In the token, for example, different authentication codes are generated automatically depending on timings, the numbers of times, and the like of authentication code transmission requests. In this case, an algorithm for authentication code generation is shared by the main body device 200 and the authentication device 300.

In addition, each code in the authentication source information 281 is not limited to a single alphanumeric character. It may be a plurality of characters, a digit string, a symbol or the like.

By applying these modifications, confidentiality of transmitted and received data is enhanced.

Second Embodiment

Next, a second embodiment of the present invention is explained. In the present embodiment, on the side of the authentication device, an authentication code is generated further taking into consideration a result of authorized user authentication, and is transmitted as a reply.

The overall configuration of the user authentication system 100 in the present embodiment is basically similar to that in the first embodiment. Hereinafter, the present embodiment is explained focusing on configurations that are different from those in the first embodiment.

In the present embodiment, in response to establishment of communication between the main body device 200 and the authentication device 300, the main body device 200 transmits the authentication code transmission request 285 to the authentication device 300, similarly to the first embodiment. In response to reception of the authentication code transmission request 285, the authentication device 300 performs authorized user authentication of a user who is holding the authentication device 300, generates the authentication code 286 taking into consideration success or failure of the authorized user authentication, and transmits the authentication code 286 as a reply.

[Main Body Device]

The main body device 200 in the present embodiment has similar hardware configurations and functional blocks to those in the first embodiment.

It should be noted, however, that, as mentioned below, authorized user authentication is performed at the authentication device 300. Then, the authentication code 286 transmitted as a reply is generated taking into consideration a result of the authorized user authentication. Accordingly, the authentication source information 281 and the authentication code generation algorithm 282 in the present embodiment additionally include information that allows distinction between authorized user authentication success and failure.

The verification unit 272 uses the authentication source information 281 and the authentication code generation algorithm 282 to generate a verification authentication code. It should be noted, however, that the verification unit 272 generates, as the verification authentication code, an authentication code transmitted as a reply at the time of authorized user authentication success and an authentication code transmitted as a reply at the time of authorized user authentication failure in such a manner that they can be distinguished from one another. Note that the verification unit 272 may create only an authentication code transmitted as a reply at the time of authorized user authentication success.

For example, if there is a match with the verification authentication code of the authentication code transmitted as a reply at the time of authorized user authentication failure, the verification unit 272 issues a notification to that effect to the operation control unit 275. Then, the operation control unit 275 may be configured to display, on the display 241, a message meaning that an invalid holder is holding a valid authentication device 300, for example.

[Authentication Device]

The authentication device 300 in the present embodiment is explained. The authentication device 300 in the present embodiment performs authorized user authentication as mentioned above. Because of this, the authentication device 300 in the present embodiment includes functionalities and configurations for authorized user authentication.

Figure 7A:
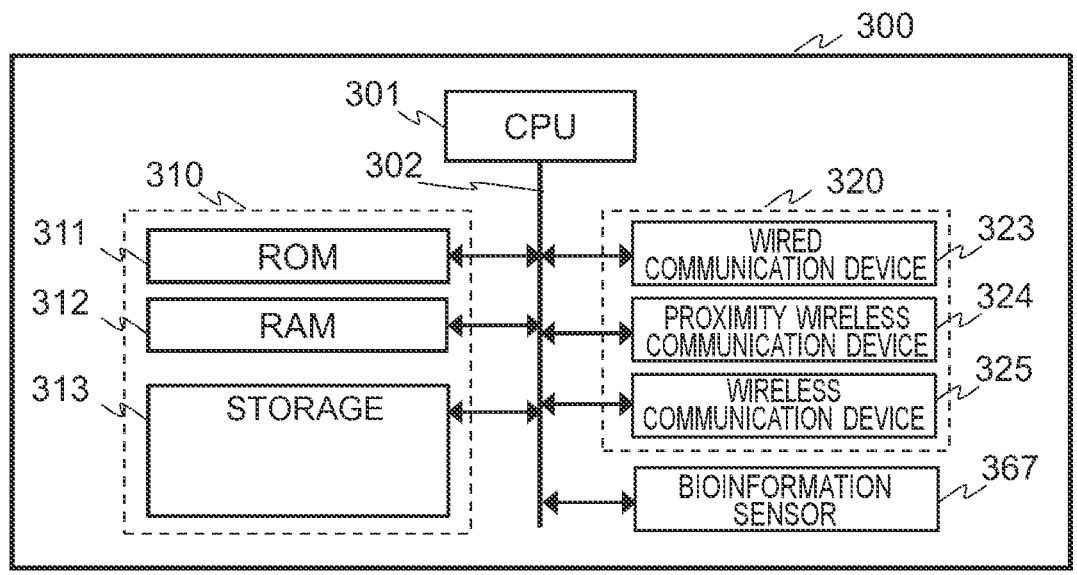
FIG. 7A is a hardware configuration diagram of an authentication device in a second embodiment.

FIG. 7A is a hardware configuration diagram of the authentication device 300 in the present embodiment. As illustrated in this drawing, the authentication device 300 in the present embodiment further includes a bioinformation sensor 367 in addition to the configurations of the authentication device 300 in the first embodiment.

The bioinformation sensor 367 is a sensor that collects bioinformation. For example, if the authentication device 300 is a wrist watch type wearable terminal, the bioinformation sensor 367 may be a pulse wave sensor or a heart rate sensor. Other than these, the bioinformation sensor 367 may be an image capturing apparatus such as a camera that captures images of fingerprints, veins, irises, and the like. Note that the bioinformation sensor 367 functions as a bioinformation acquiring unit along with a biometric authenticating unit 373 mentioned below.

Figure 7B:
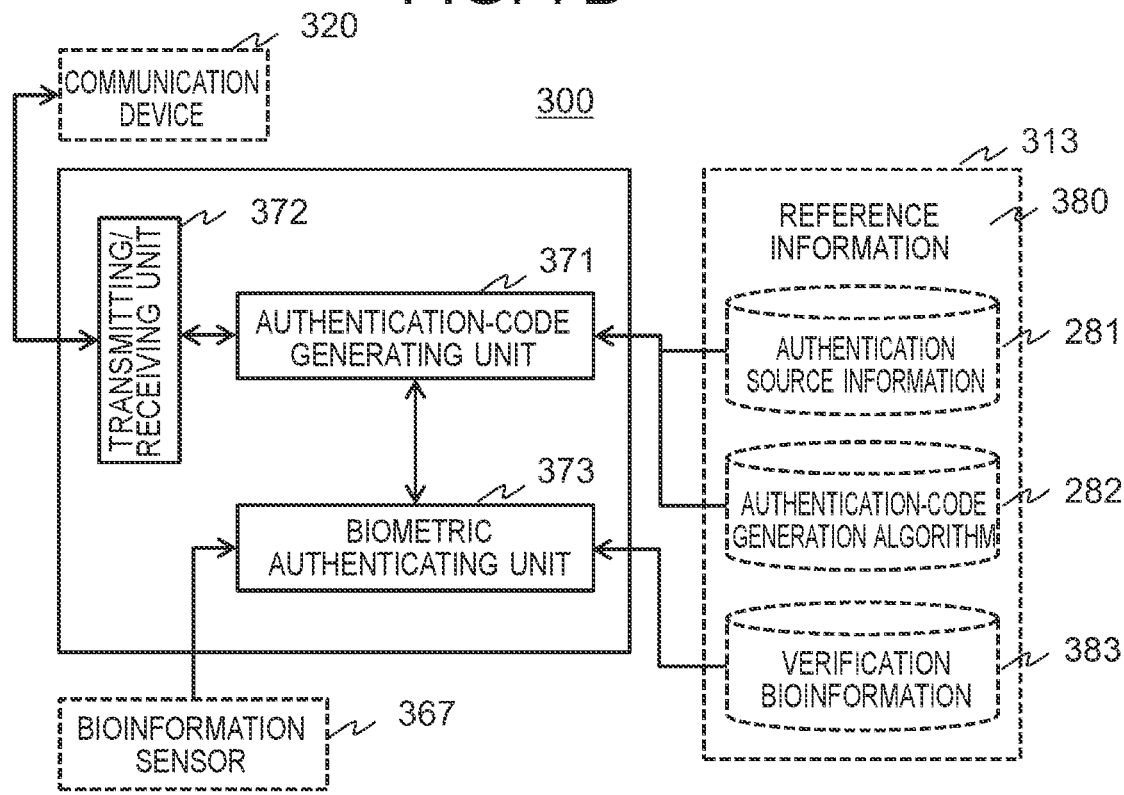
FIG. 7B is a functional block diagram of the authentication device in the second embodiment.

FIG. 7B is a functional block diagram of the authentication device 300 in the present embodiment. As illustrated in this drawing, the authentication device 300 in the present embodiment further includes the biometric authenticating unit 373 in addition to the configurations in the first embodiment. That is, the authentication device 300 includes a program that realizes the biometric authenticating unit 373 in the ROM 311.

In addition, as verification bioinformation 383, bioinformation of a valid user (holder) of the authentication device 300 is further registered in the reference information 380 of the storage 313. The verification bioinformation 383 is acquired in advance when the valid holder holds the authentication device 300. For example, if the authentication device 300 is a wrist watch type terminal, the pulse waves or heart rate are/is acquired by the bioinformation sensor 367 for a predetermined length of time (e.g. for 10 seconds, for one minute, etc.) when the user wears the authentication device 300 for the first time. Then, a result of the acquisition is stored in the storage 313 as the verification bioinformation 383.

In response to reception of the authentication code transmission request 285 via the transmitting/receiving unit 372, at the time point, the biometric authenticating unit 373 in the present embodiment acquires bioinformation of the holder. The bioinformation is acquired via the bioinformation sensor 367. Then, the acquired bioinformation is verified against the verification bioinformation 383, and a result of the verification is output to the authentication code generating unit 371.

The authentication code generating unit 371 generates the authentication code 286 taking into consideration the verification result. Specific examples are mentioned below.

Figure 8:
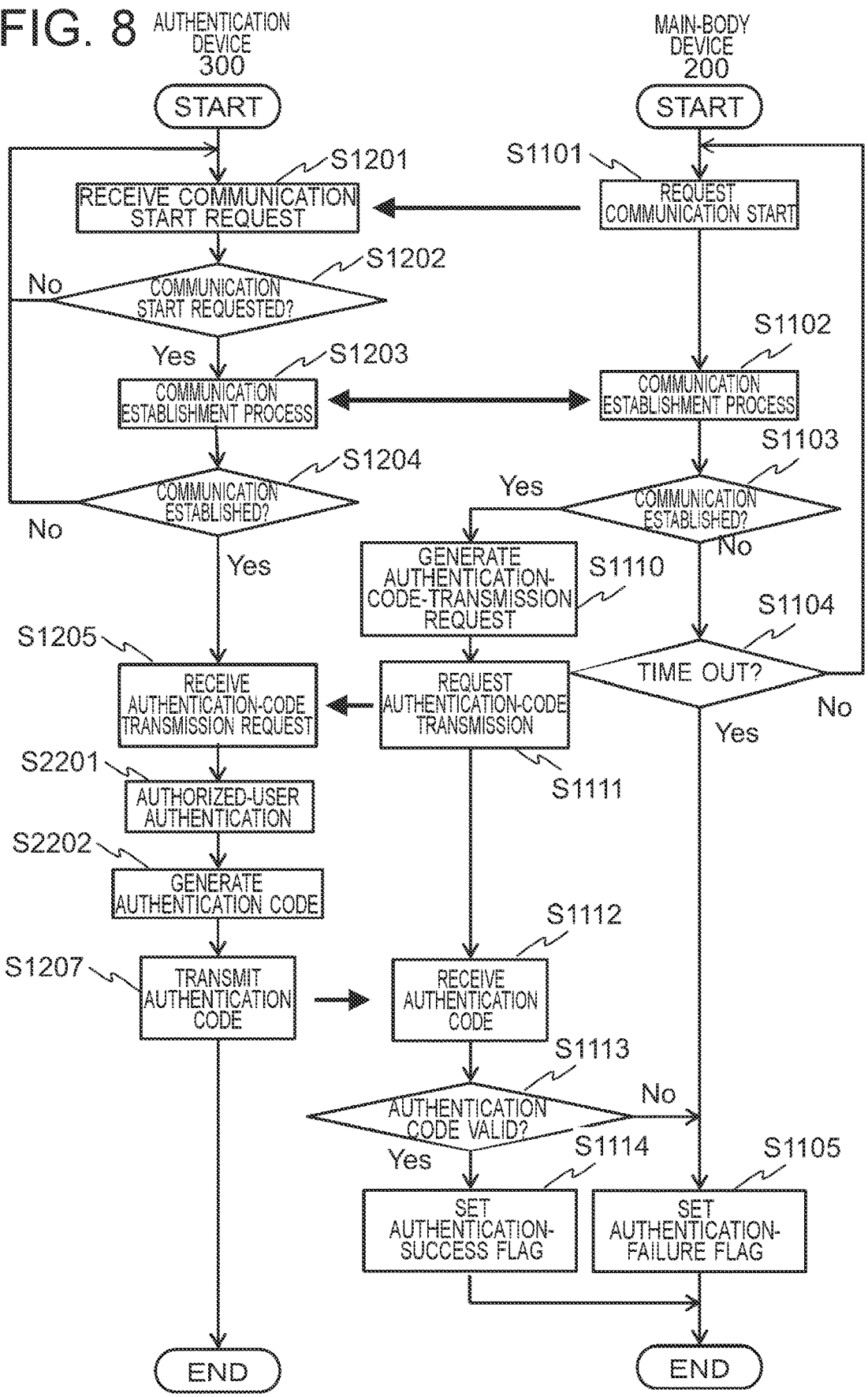
FIG. 8 is a flowchart of a user authentication process in the second embodiment.

Hereinafter, the flow of a user authentication process in the present embodiment is explained. FIG. 8 illustrates the process flow of the user authentication process in the present embodiment. Note that explanations of portions that have counterparts in the first embodiment are omitted.

In response to establishment of bidirectional communication (Steps S1204 and S1103), the authentication code transmission request generating unit 271 of the main body device 200 generates an authentication code transmission request 285 (Step S1110), and transmits the authentication code transmission request 285 to the authentication device 300 (Step S1111).

On the side of the authentication device 300, in response to reception of the authentication code transmission request 285 by the transmitting/receiving unit 372 (Step S1205), the biometric authenticating unit 373 performs authorized user authentication (Step S2201). Here, bioinformation is collected for a predetermined period. The bioinformation is collected by the bioinformation sensor 367. Then, the acquired bioinformation is compared with the verification bioinformation 383. Then, a result of the comparison is output to the authentication code generating unit 371.

The authentication code generating unit 371 generates an authentication code (Step S2202), and the transmitting/receiving unit 372 transmits the generated authentication code to the main body device 200 (Step S1207). Specific examples of the authentication code generated here are mentioned below.

In response to reception of the authentication code by the transmitting/receiving unit 274 of the main body device 200 (Step S1112), the verification unit 272 judges its validity (Step S1113). In the present embodiment also, it is judged whether the authentication code matches the verification authentication code generated in advance. If they match, the verification unit 272 judges that the authentication is successful, sets an authentication success flag (Step S1114), and ends the process.

On the other hand, if they do not match, the verification unit 272 judges that the authentication failed, and proceeds to Step S1105.

Note that if the authentication success flag is set after the user authentication process mentioned above ended, the unlocking unit 273 unlocks the authentication required functionality instructed to execute, and makes it possible to use the authentication required functionality. Specifically, an instruction from a user for the functionality is accepted.

Next, specific examples of the authentication code generated in the present embodiment are explained. First, specific examples of the authentication source information 281 prepared in the present embodiment are explained. Second values that are to be transmitted as a reply at the time of authorized user authentication success and third values that are to be transmitted as a reply at the time of authorized user authentication failure are stored in the authentication source information 281 in the present embodiment in association with first values.

FIG. 9A illustrates one example of the authentication source information 281 in the present embodiment. As illustrated in this drawing, the authentication source information 281 includes addresses 281*a* which are first values, codes 1 (281*b*) which are second values corresponding to the addresses 281*a*, and codes 2 (281*c*) which are third values. Note that the second values are values to be transmitted as a reply if authorized user authentication is successful, and third values are values to be transmitted as a reply if authorized user authentication failed.

In the present embodiment also, information transmitted by the main body device 200 as the authentication code transmission request 285 is one or more addresses 281*a*. Then, at the authentication device 300, in response to success or failure of authorized user authentication, a corresponding code 1 (281*b*) or code 2 (281*c*) is generated as the authentication code 286, and transmitted as a reply.

In the present embodiment, the verification unit 272 of the main body device 200 may generate, as the verification authentication code, an authentication code using the code 1 (281*b*) transmitted as a reply at the time of authorized user authentication success.

For example, if the authentication source information 281 illustrated in FIG. 9A is used, 2, 5, 7, and 9 may be designated as the addresses 281*a* in the authentication code transmission request 285 as illustrated in FIG. 9B. In this case, if biometric authentication is successful, as illustrated in FIG. 9C, the authentication code 286 including 8, f, g, and 2 is generated, and transmitted as a reply. On the other hand, if biometric authentication failed, as illustrated in FIG. 9D, the authentication code 286 including t, 4, 2, and g is generated, and transmitted as a reply.

As explained above, in the present embodiment, a configuration of performing biometric authentication of a holder of the authentication device 300 on the side of the authentication device 300, generating an authentication code including a result indicating success or failure of the biometric authentication, and transmitting the authentication code as a reply is further provided in addition to the configurations in the first embodiment.

Because of this, according to the present embodiment, the main body device 200 can know success or failure of authorized user authentication at the authentication device 300. That is, in response to the authentication code transmitted as a reply, the main body device 200 can judge not only whether or not the authentication device 300 is a valid authentication device but also whether or not the authentication device 300 is held by a valid user.

Thus, according to the present embodiment, if, for example, the authentication device 300 is a valid authentication device but the holder is not a valid holder, circumstances such as the authentication device 300 being lost or stolen can be known. Since such a judgement is possible, security can be ensured even if the authentication device 300 is lost or stolen.

In this manner, according to the present embodiment, a safer user authentication system can be provided while a high security level during transmission and reception is maintained.

Note that in the present embodiment also, different types of variations are possible similarly to the first embodiment.

<Modifications>

In addition, it may be configured such that if authorized user authentication is successful at the authentication device 300, its history is held on the side of the authentication device 300. In the present embodiment, as mentioned above, the authentication device 300 performs authorized user authentication every time an authentication code transmission request is received. At this time, success or failure is stored in the storage 313 in association with a time at which the authentication is performed.

It may be configured such that the authentication code 286 is transmitted as a reply in such a manner that distinction can be made between cases where authorized user authentication is successful consecutively a predetermined number of times and cases where authorized user authentication is successful only intermittently.

For example, as illustrated in FIG. 9A, fourth values (codes 3 (281*d*)) are further stored as the authentication source information 281 in association with first values. Then, if authorized user authentication is successful consecutively, second values are transmitted as a reply, and if authorized user authentication is successful only intermittently, fourth values are transmitted as a reply.

Thereby, it is possible to know on the side of the main body device 200 whether the authentication device 300 is in a situation where it has not been away from the body of a proper holder or in a situation where it has been away from the body of the proper hold even once. If it is in a suspicious situation for reasons such as frequent failure of authorized user authentication, security may be strengthened for example by further requesting an input of a PIN code or by other means.

Third Embodiment

Next, a third embodiment of the present invention is explained. In the present embodiment, both the main body device 200 and the authentication device 300 record activity histories of their holders. Then, if the activity histories of both the main body device 200 and the authentication device 300 match, it is regarded as authorized user authentication success.

The user authentication system 100 in the present embodiment has configurations basically similar to those in the first embodiment. Hereinafter, the present embodiment is explained focusing on configurations that are different from those in the first embodiment.

[Main Body Device]

Figure 10:
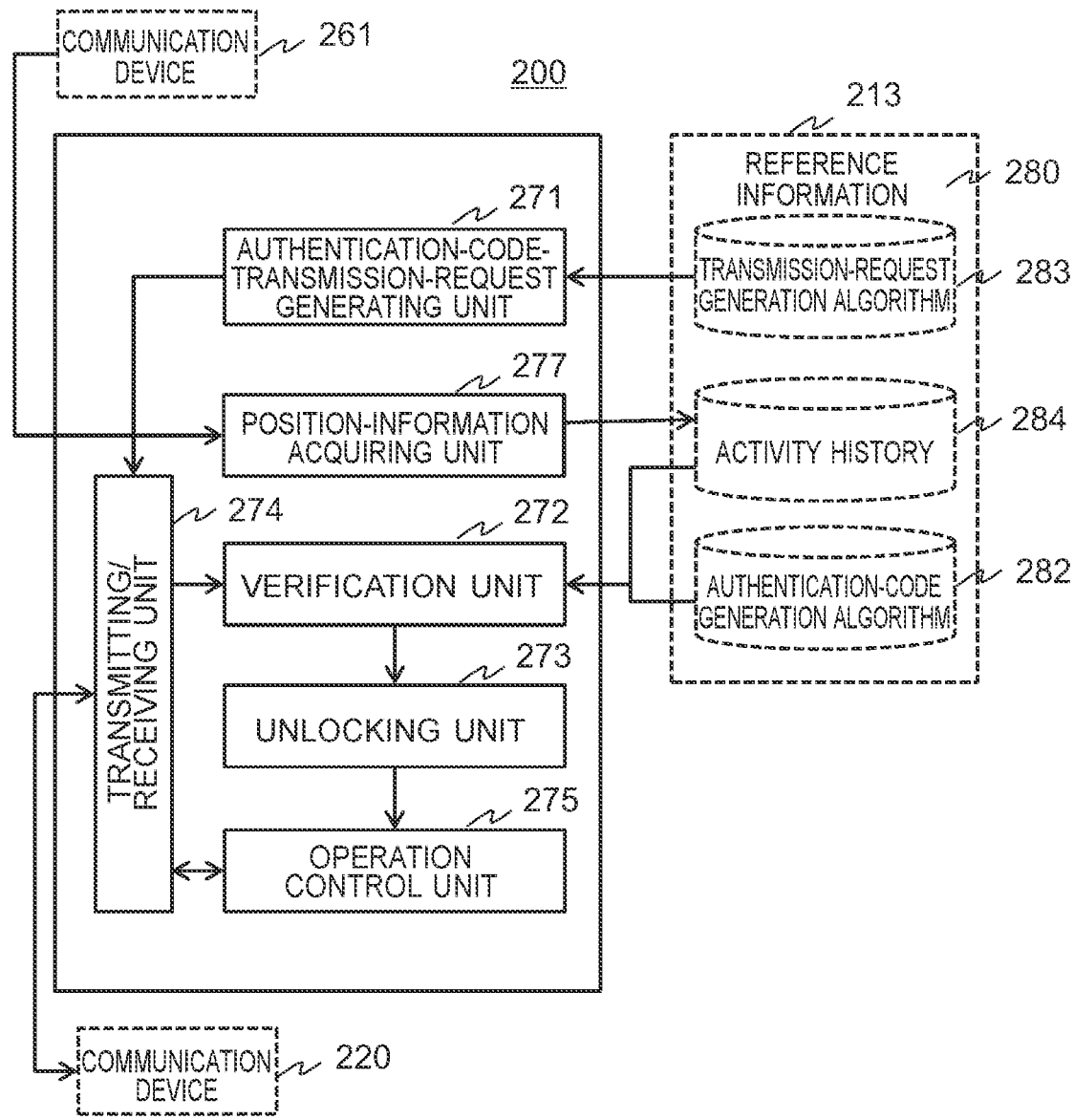
FIG. 10 is a functional block diagram of a main body device in a third embodiment.

Hardware configurations of the main body device 200 in the present embodiment are basically similar to those in the first embodiment. However, functionalities realized by the main body device 200 are different. FIG. 10 illustrates functional blocks of the main body device 200 in the present embodiment.

As illustrated in this drawing, the main body device 200 in the present embodiment includes a position information acquiring unit 277 in addition to the configurations in the first embodiment. Specifically, a program to realize the position information acquiring unit 277 is stored in the ROM 211, and the CPU 201 loads the program onto the RAM 212 and executes the program to thereby realize the functionality of the position information acquiring unit 277.

The position information acquiring unit 277 acquires current position information via the GPS receiving device 261, for example. The acquired position information is stored as an activity history 284 in the storage 213 in association with an acquired time. In the present embodiment, this activity history 284 is used as the authentication source information.

The transmission request generation algorithm 283 in the present embodiment is defined to designate a time period (period) of an activity history 284 to be transmitted as a reply, for example. The authentication code generation algorithm 282 is defined to extract position information of the designated time period (period) from the activity history 284.

In addition, the verification unit 272 of the main body device extracts an activity history (position information) of the period designated by the authentication code transmission request 285 from the activity history 284, and generates a verification authentication code.

[Authentication Device]

Figure 11A:
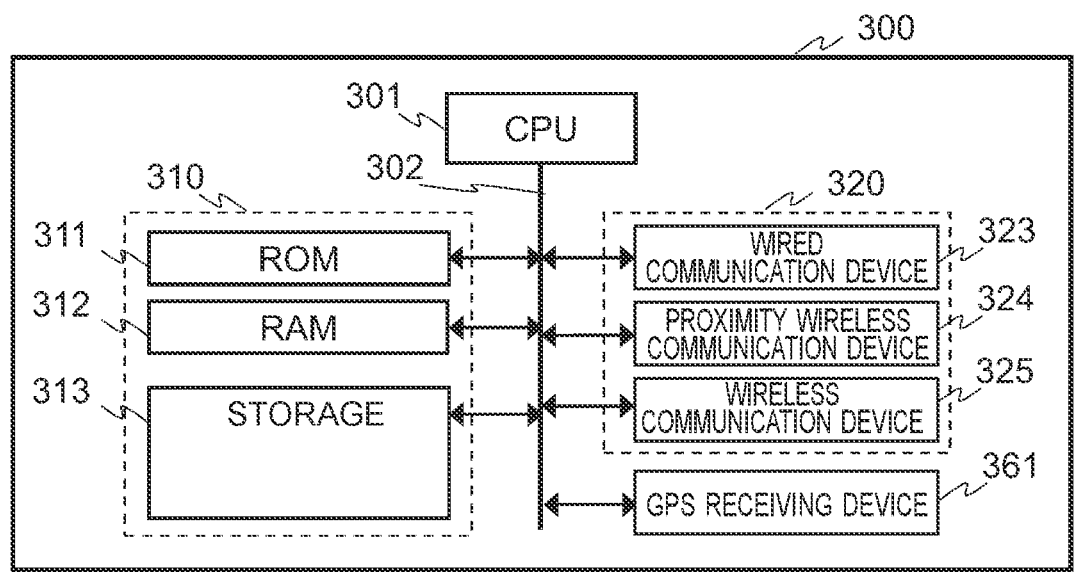
FIG. 11A is a hardware configuration diagram of an authentication device in the third embodiment.

Next, the authentication device 300 in the present embodiment is explained. FIG. 11A is a hardware configuration diagram of the authentication device 300 in the present embodiment. As illustrated in this drawing, the authentication device 300 in the present embodiment includes a GPS receiving device 361 in addition to the configurations in the first embodiment.

Figure 11B:
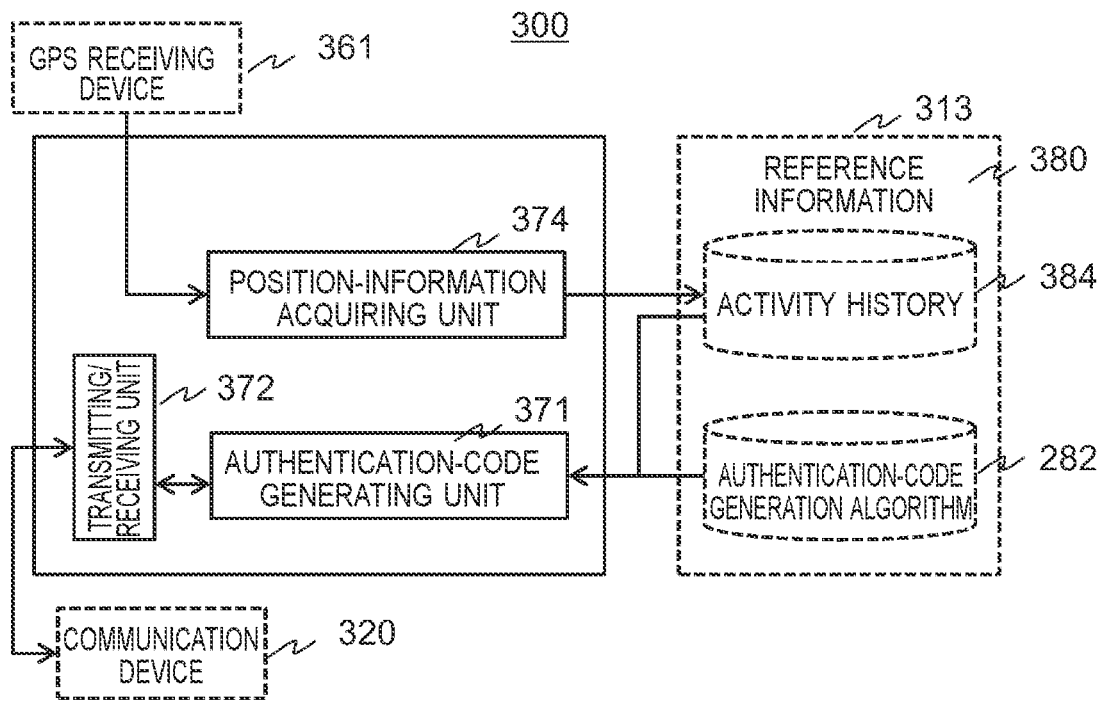
FIG. 11B is a functional block diagram of the authentication device in the third embodiment.

FIG. 11B is a functional block diagram of the authentication device 300 in the present embodiment. As illustrated in this drawing, the authentication device 300 in the present embodiment includes a position information acquiring unit 374 in addition to the configurations in the first embodiment. In addition, the storage 313 further includes an activity history 384 that includes acquired position information registered in association with a time.

When the power supply of the authentication device 300 is turned on, the position information acquiring unit 374 in the present embodiment calculates position information of itself in accordance with GPS signals received by the GPS receiving device 361 at predetermined time intervals. Then, the position information acquiring unit 374 stores a result of the calculation in the storage 313 as the activity history 384 in association with a time.

The authentication code generating unit 371 in the present embodiment extracts an activity history (position information) of a period designated by the authentication code transmission request 285 from the activity history 384, and uses the activity history as an authentication code.

Note that, in the present embodiment, the main body device 200 and the authentication device 300 desirably acquire position information at the same intervals synchronously. However, if this is difficult, the authentication code generating unit 371 determines acquisition times respectively closest to the starting point and end point of the period designated by the authentication code transmission request 285, extracts position information between the acquisition times, and uses the position information as the authentication code 286.

In addition, the verification unit 272 may be configured to set a predetermined tolerance range, and judge that there is a match if the information being verified is within the tolerance range.

Figure 12:
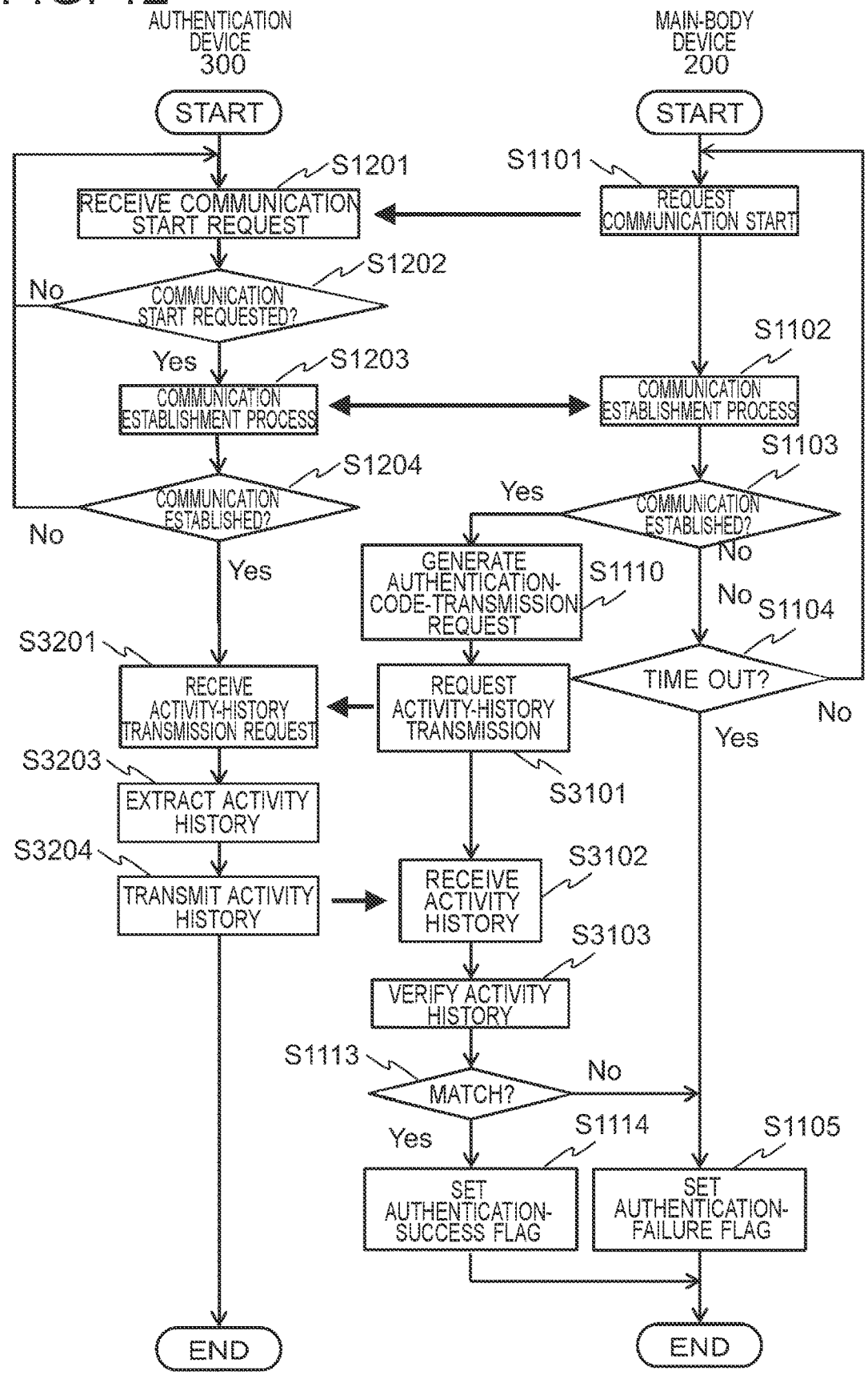
FIG. 12 is a flowchart of a user authentication process in the third embodiment.

Hereinafter, the flow of a user authentication process in the present embodiment is explained. FIG. 12 illustrates the process flow of the user authentication process in the present embodiment. Note that explanations of portions that have counterparts in the first embodiment are omitted.

In response to establishment of bidirectional communication (Steps S1204 and S1103), the authentication code transmission request generating unit 271 of the main body device 200 generates an activity history transmission request as the authentication code transmission request 285 (Step S1110), and transmits the activity history transmission request to the authentication device 300 (Step S3101). Here, the authentication code transmission request generating unit 271 selects a period from among periods for which the activity history 284 is stored, and designates the period as a period for which an activity history is to be extracted.

In response to reception of the activity history transmission request by the transmitting/receiving unit 372 of the authentication device 300 (Step S3201), the authentication code generating unit 371 of the authentication device 300 extracts an activity history (position information) of the designated period from the activity history 384 held in the storage 313 (Step S3203), and generates the authentication code 286. Then, the transmitting/receiving unit 372 transmits the generated authentication code 286 (activity history) to the main body device 200 (Step S3204).

In response to reception of the authentication code by the transmitting/receiving unit 274 of the main body device 200 (Step S3102), the verification unit 272 judges its validity (Step S3103). Here, it is judged whether the authentication code matches the verification authentication code generated in advance. In the present embodiment, depending on the timing of collection of position information, a transmitted authentication code and a verification authentication code do not match completely in some cases. Accordingly, it may be judged whether they match or do not match by providing a predetermined tolerance range as mentioned above.

If they match, the verification unit 272 judges that the authentication is successful, sets an authentication success flag (Step S1114), and ends the process.

On the other hand, if they do not match, the verification unit 272 judges that the authentication failed, and proceeds to Step S1105.

Here, examples of the activity histories 284 and 384 in the present embodiment are illustrated. Here, as illustrated in FIG. 13A, an example of the activity history 284 is representatively illustrated. As illustrated in this drawing, the activity history 284 includes latitude/longitude information registered as position information 284b in association with times 284a. FIG. 13A illustrates an example in which the position information 284b is registered every minute, for example.

For example, if an activity history transmission request requests for position information of 8 to 10 o'clock on Nov. 1, 2017, the authentication code generating unit 371 extracts position information corresponding to this period from the activity history 384, and uses the position information as the authentication code 286. Note that position information to be used as the authentication code may not include all the digits, considering precision.

According to the present embodiment, the position information of the main body device 200 and the authentication device 300 is accumulated as activity histories at both the main body device 200 and the authentication device 300. Then, as the authentication code, the main body device 200 receives an activity history of a predetermined period from the authentication device 300.

In the present embodiment also, an authentication code to be transmitted differs for each instance of authentication. Accordingly, similarly to each embodiment described above, the safety at the time of transmission and reception of authentication codes is high. In addition, in the present embodiment, it is not necessary for the main body device 200 and the authentication device 300 to share authentication source information in advance. Because of this, there is no data transmission/reception for sharing this authentication source information. Accordingly, a safer user authentication system can be obtained.

Note that in the present embodiment also, different types of variations are possible similarly to the first embodiment.

<Modifications>

In addition, although in the present embodiment, position information is always acquired, and recorded as activity histories at both the main body device 200 and the authentication device 300, this manner is not the sole example. For example, execution of an authentication process may be controlled on the basis of whether a position at which a particular process is performed is within a normal activity area or away from the normal activity area.

For example, on the side of the main body device 200, on the basis of past success of authentication processes related to a particular process, an activity area of the main body device 200 is identified from collected position information.

In the present modification, for example, as illustrated in FIG. 13B, every time authentication is concluded as being successful, the verification unit 272 stores the number of times (authentication success count) 284d authentication is concluded as being successful, in association with the position information 284c obtained when the authentication is performed. The position information 284c used is information that is acquired by the position information acquiring unit 374, and stored in the activity history 284. That is, the position information 284c used is information specified with latitude and longitude.

Then, the verification unit 272 sets a position where an authentication success count 284d is equal to or greater than a predetermined number of times as an authentication past success position. In addition, an area specified with the position information 284c corresponding to the authentication past success position is set as a normal activity area 284e. Note that, for example, positions where authentication success counts 284d are equal to or greater than 10 are set as authentication past success positions in FIG. 13B. Then, information of the normal activity area 284e, that is, the position information 284c and the authentication success counts 284d of the normal activity area 284e, is stored in the storage 213 instead of the activity history 284. Note that here positions that are different, but whose distances from each other are within a tolerance range are treated as the same position.

The verification unit 272 judges whether or not the position of the main body device 200 at the time of authentication is within the normal activity area 284e. If the position is within the normal activity area 284e and the particular process is not an important process, authentication by the authentication device 300 is omitted, and if the position is away from the normal activity area 284e or the particular process is an important process, authentication by the authentication device 300 is executed.

Here, an important particular process is, for example, a settlement process that involves settlement of an amount of money that is equal to or greater than a predetermined certain amount of money, if the particular process is a settlement process like payment.

In addition, the main body device 200 may store, in the storage 213, the activity history 284 in association with processes.

In addition, the normal activity area 284e is not limited to an area specified with authentication past success positions. An area whose distance from authentication past success positions is shorter than a predetermined distance may be treated as being included in the normal activity area 284e.

Figure 14:
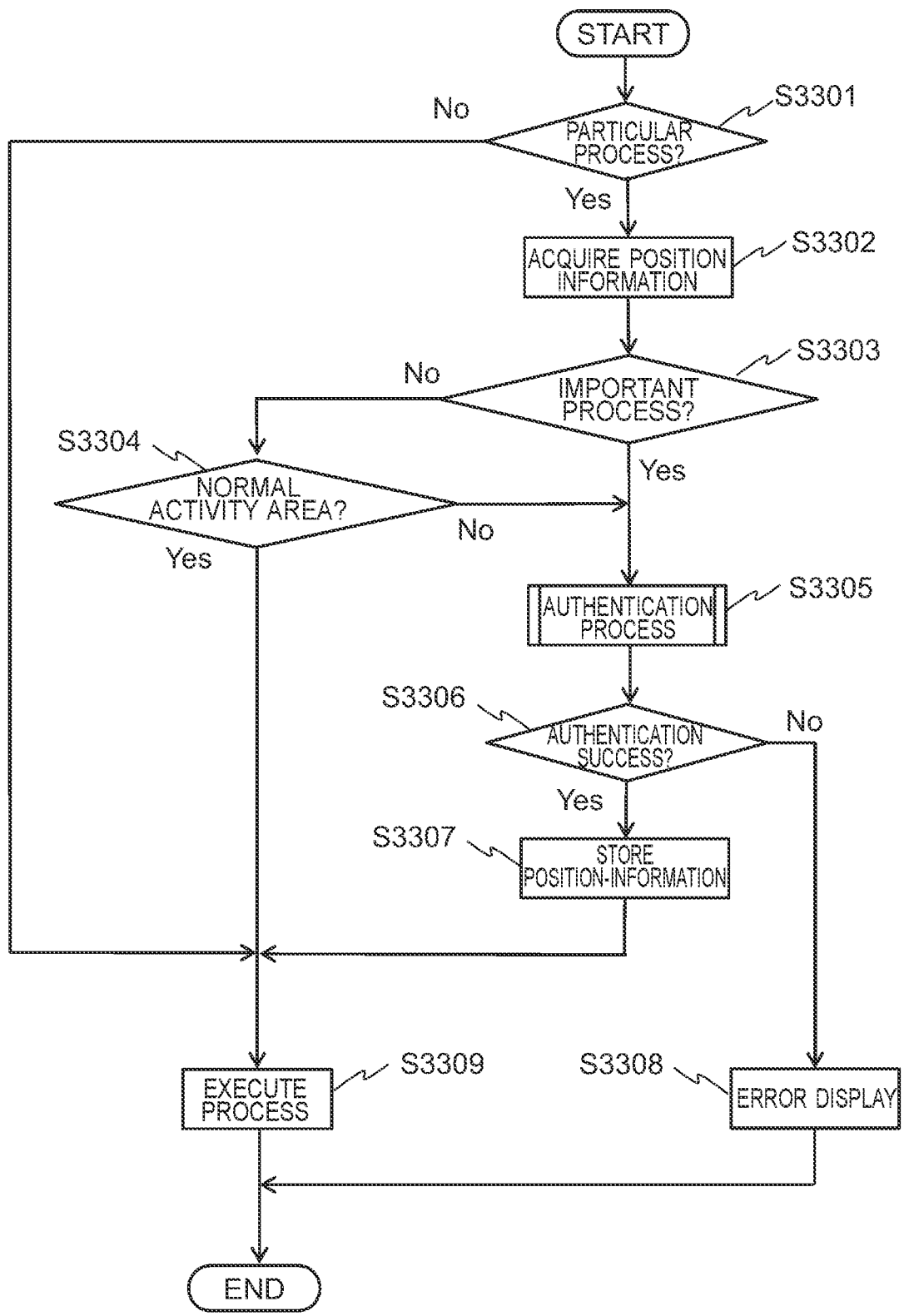
FIG. 14 is a flowchart of an activity history collection process and an authentication process in the modification of the third embodiment.

The flow of the activity history collection process and the authentication process in the present modification are illustrated in FIG. 14. As illustrated in this drawing, the position information acquiring unit 277 judges whether or not a process to be performed by the operation control unit 275 is the particular process (Step S3301). If the process is not the particular process, the process is executed (Step S3309), and ended.

On the other hand, if the process is the particular process, position information is acquired (Step S3302). Then, the operation control unit 275 further judges whether or not the particular process is an important process (Step S3303), and if the particular process is an important process, the authentication process is performed (Step S3305). Then, if the authentication is successful (Step S3306), the verification unit 272 stores acquired position information as the activity history 284 in association with the particular process and an acquisition time (Step S3307), and performs execution of the particular process (Step S3309). At this time, the same activity history 284 (the normal activity area 284e) may be stored also in the authentication device 300.

On the other hand, if the authenticate is unsuccessful (Step S3306), the operation control unit 275 displays a notification of the error (Step S3308), and ends the process.

If it is judged at Step S3303 that the particular process is not an important process (Step S3303), the verification unit 272 judges whether or not the position of the main body device 200 is within the normal activity area 284e (Step S3304). If it is judged that the position is not within the normal activity area 284e, the flow proceeds to Step S3305 at which the authentication process is performed. On the other hand, if it is judged that the position is within the normal activity area 284e, the process is executed (Step S3309), and ended.

For example, the particular process may be a settlement process at a store and the like. With a configuration in this manner, position information of a store where the user is a regular customer is registered in advance. Then, if a settlement process is to be performed at a location other than the preregistered store, the lock is never unlocked automatically. Accordingly, in addition to the safety of data transmission/reception, high safety can be obtained also for process execution.

Note that the activity history 284 for each process may be registered in association with a time period. In addition, the third embodiment may be combined with the first or second embodiment.

In addition, in the present modification, the same data as the authentication past success histories (284c and 284d) may be accumulated as the activity history 384 in the authentication device 300, and in an authentication code transmission request, transmission of the past authentication past success histories (284c and 284d) may be requested. In this case, the verification unit 272 judges the validity of a holder of the authentication device 300 on the basis of whether or not the authentication past success histories (284c and 284d) of the authentication device 300 transmitted as a reply in response to the request are identical to a record of the authentication past success history (284c and 284d) recorded in the main body device 200.

Fourth Embodiment

Next, a fourth embodiment of the present invention is explained. Prior to the user authentication process explained about each embodiment described above, it is necessary to perform initial setting of transmitting information required for the user authentication process such as authentication source information from the main body device 200 to the authentication device 300. In the present embodiment, the safety at the time of this initial setting is enhanced.

In the first, second and third embodiments described above, as the initial setting, the authentication source information 281 and/or the authentication code generation algorithm 282 are/is set in the main body device 200, and are/is transmitted to the authentication device 300. In addition, every time the authentication source information 281 and/or the authentication code generation algorithm 282 are/is changed, they/it are/is transmitted from the main body device 200 to the authentication device 300. That is, every time the authentication source information 281 and/or the authentication code generation algorithm 282 are/is newly set or updated, the initial setting for the main body device 200 and the authentication device 300 to share the newly set or updated authentication source information 281 and/or authentication code generation algorithm 282 is performed.

In each embodiment described above, information to be transmitted from the main body device 200 to the authentication device 300 at the time of initial setting is different. Here, on the basis of the first embodiment, explanations are given focusing on configurations different from those in the first embodiment.

Hardware configurations of the main body device 200 and the authentication device 300 in the present embodiment are basically similar to those in the first embodiment.

[Main Body Device]

Figure 15A:
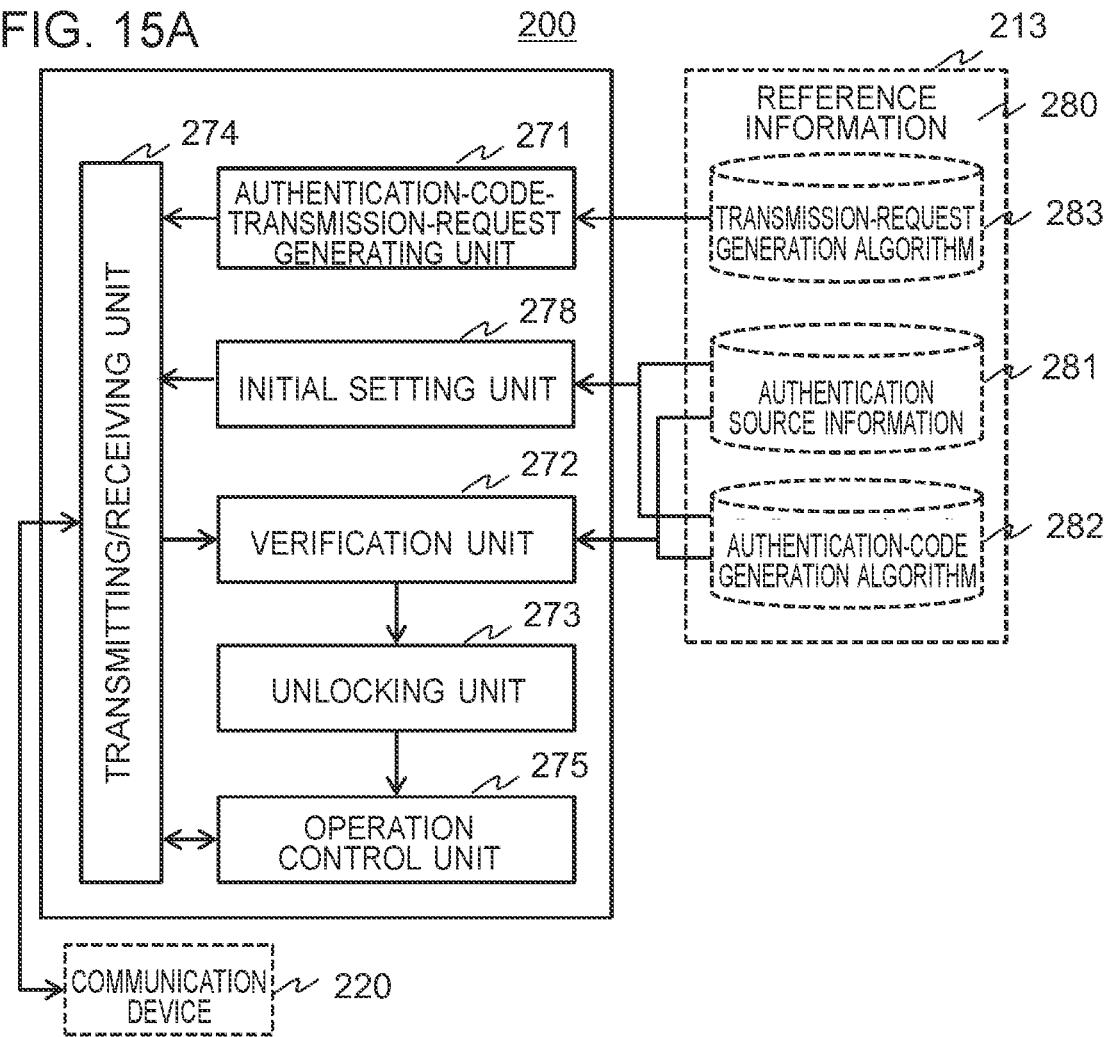
FIG. 15A is a functional block diagram of a main body device in a fourth embodiment.

Functional blocks of the main body device 200 in the present embodiment are illustrated in FIG. 15A. As illustrated in this drawing, the main body device 200 in the present embodiment includes an initial setting unit 278 in addition to the configurations in the first embodiment.

At the time of initial setting, the initial setting unit 278 transmits the authentication source information 281 and the authentication code generation algorithm 282 set in the main body device 200 to the authentication device 300. At the time of the transmission, the initial setting unit 278 selects not transmitting means used for normal data transmission/reception to and from the authentication device 300 but communication means with a short range or wired communication.

Note that the authentication source information 281 and the authentication code generation algorithm 282 are registered in the storage 213 in advance by a user of the main body device 200. In response to reception of an instruction for initial setting from the user, the initial setting unit 278 in the present embodiment selects communication means to be used at the time of initial setting, and also performs the initial setting process.

As the communication means, communication means which is the safest among communication means that allow communication between the main body device 200 and the authentication device 300 is selected. For example, wired communication by using the wired communication device 223 is selected. In addition, if wireless communication is to be selected, for example, wireless communication with the shortest range such as wireless communication by using the proximity wireless communication device 224 is selected.

The priority order of this selection is preset, and held in the storage 213 and the like, for example. Note that it may be configured such that the user gives each time an instruction about a communication device to use.

In addition, it may be configured such that if wired communication is selected, the initial setting unit 278 displays on the display 241 a message prompting the user to establish wired connection between the main body device 200 and the authentication device 300.

In addition, if a USB I/F is provided on the side of the authentication device 300, data transfer may be performed by connecting a USB I/F of the main body device 200 and the USB I/F of the authentication device 300 by a USB cable.

Figure 15B:
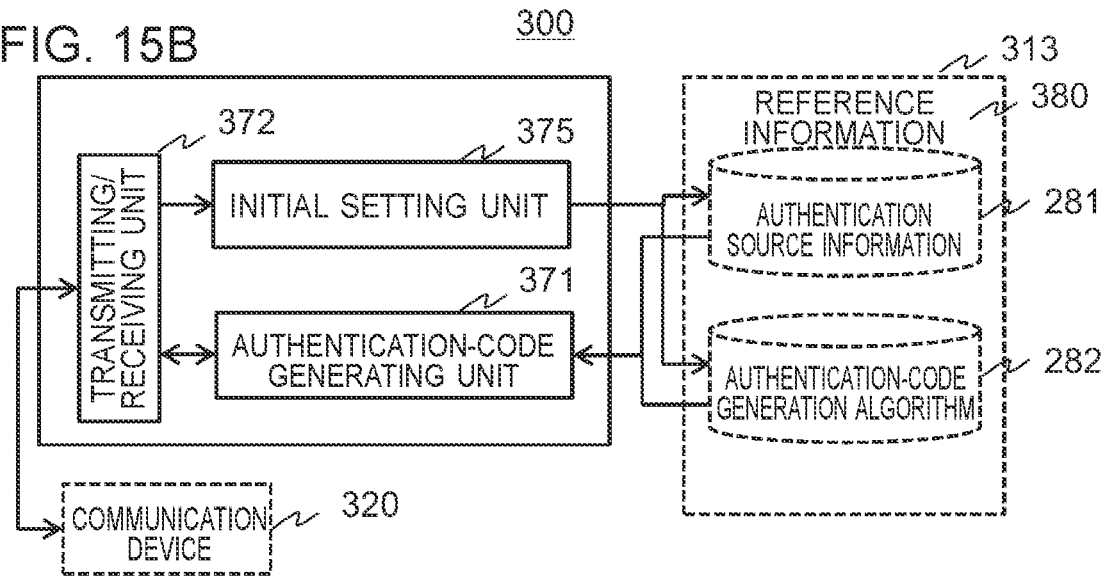
FIG. 15B is a functional block diagram of an authentication device in the fourth embodiment.

FIG. 15B is a functional block diagram of the authentication device 300 in the present embodiment. As illustrated in this drawing, an initial setting unit 375 is provided, in addition to the configurations in the first embodiment.

The initial setting unit 375 performs a process to be performed at the time of receiving the authentication source information 281 and the authentication code generation algorithm 282 from the main body device 200. In the present embodiment, communication means according to communication means set by the main body device 200 is set as receiving means, and is used for receiving information from the main body device 200.

Figure 16A:
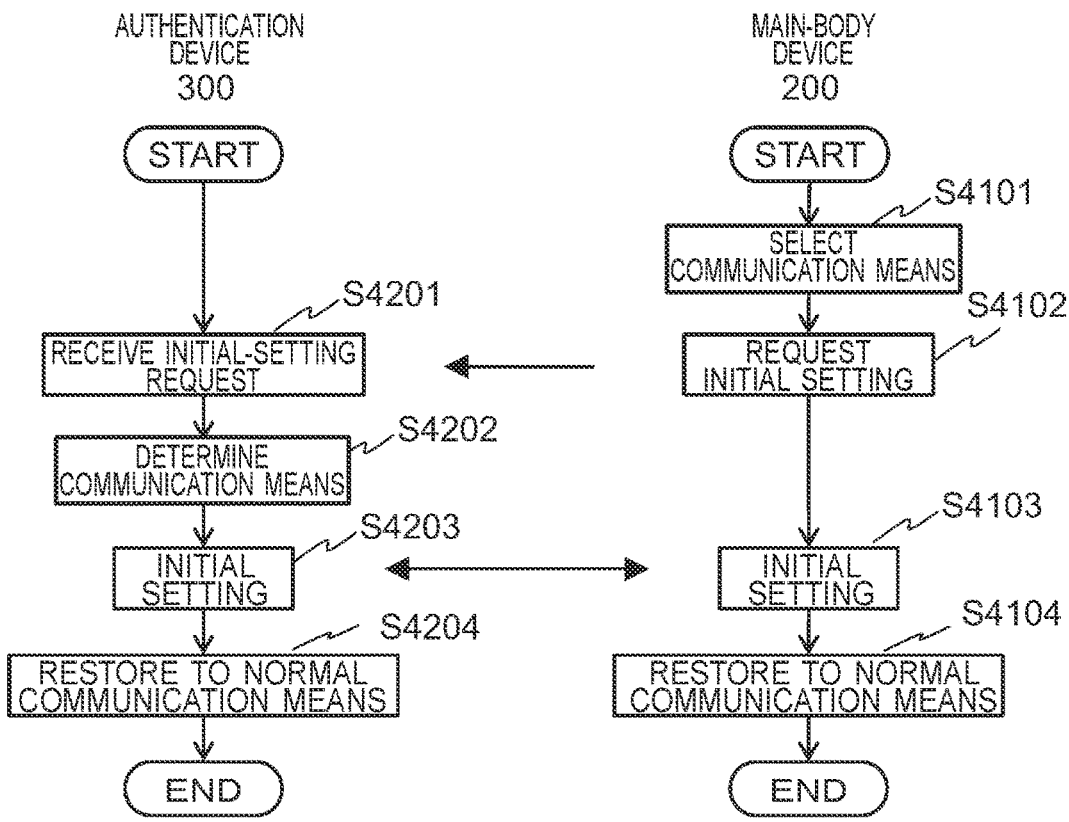
FIG. 16A is a flowchart of an initial setting process in the fourth embodiment.

FIG. 16A is a flow diagram for explaining the flow of a process performed at the time of initial setting in the present embodiment. Note that at the start time point of the present process, the authentication source information 281 and the authentication code generation algorithm 282 may be registered in the main body device 200. In addition, the present process is triggered by reception of an instruction for starting the initial setting from the holder of the main body device 200.

First, the initial setting unit 278 of the main body device 200 selects communication means (Step S4101). Then, an initial setting request for requesting to establish communication through the selected communication means is transmitted to the authentication device 300 (Step S4102).

In response to reception of a communicate establishment request as the initial setting request at the authentication device 300 (Step S4201), the initial setting unit 375 performs a process of establishing communication through the requested communication means, and communication is established through the communication means (Step S4202).

In response to establishment of the communication, the initial setting unit 278 performs initial setting of transmitting the authentication source information 281 and the authentication code generation algorithm 282 from the main body device 200 to the authentication device 300 through the communication means (Step S4103).

The initial setting unit 375 performs initial setting of storing the transmitted authentication source information 281 and authentication code generation algorithm 282 in the storage 313 (Step S4203). Then, the initial setting unit 375 notifies the initial setting unit 278 that the storage is ended, and ends the initial setting.

In response to the end of the initial setting, the initial setting unit 278 and the initial setting unit 375 restore the communication means of their apparatuses to the normally used communication means (Steps S4104 and S4204), and end the process.

Figure 16B:
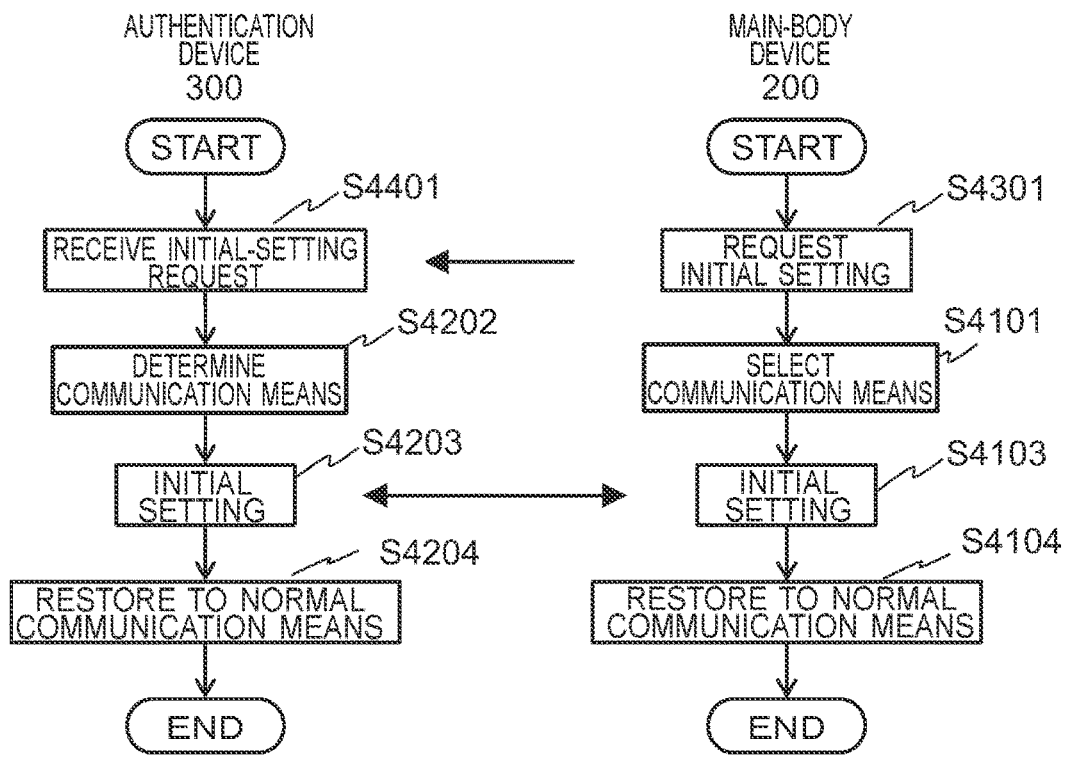
FIG. 16B is a flowchart of a modification of the initial setting process in the fourth embodiment.

Note that, as illustrated in FIG. 16B, it may be configured such that until establishment of the communication such as in transmission of the initial setting request, communication is performed through normal communication means (Steps S4301 and S4401), and after establishment of the communication, communication means is selected (Steps S4101 and S4202).

As explained above, in the present embodiment, data transmission/reception is performed through communication means with a lower possibility of leak at the time of initial setting, that is, when the authentication source information 281, which serves as the source of authentication code generation, is shared by the main body device 200 and the authentication device 300. Because of this, a safer user authentication system can be realized.

<Modifications>

In addition, although in the present embodiment, communication means to be used at the time of a user authentication process other than the wireless communication device 225 is selected to enhance the safety in each of the embodiments described above, this is not the sole example.

For example, if the wireless communication device 225 is a variable output device, the output power may be lowered at the time of an initial process than at the time of normal processes such as at the time of a user authentication process.

Figure 17:
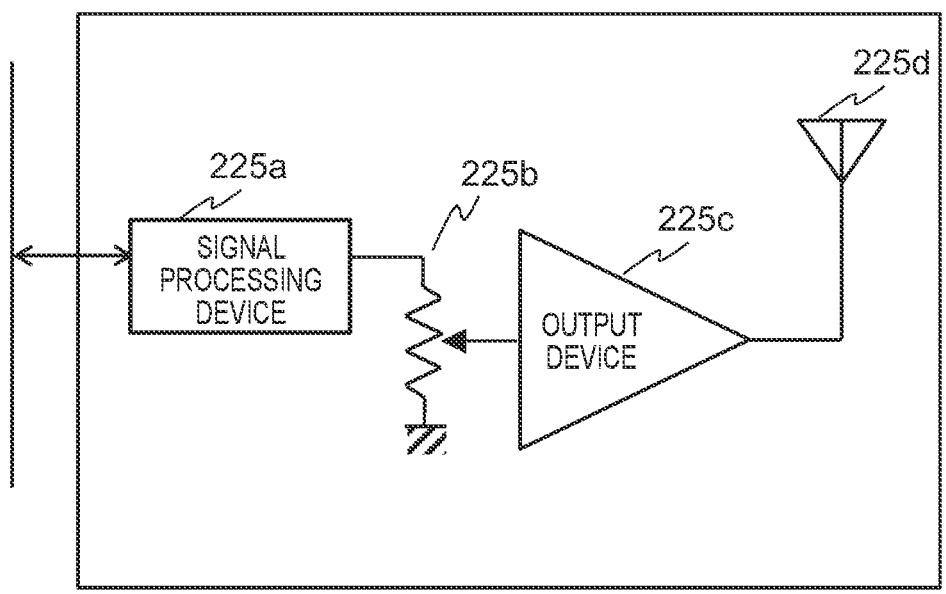
FIG. 17 is an explanatory diagram for explaining one example of a variable output wireless communication device in the modification of the fourth embodiment.

FIG. 17 illustrates a configuration example of the wireless communication device 225 with variable output. The wireless communication device 225 includes a signal processing device 225a, a variable resistance 225b, an output device 225c, and an antenna 225d.

For example, the initial setting unit 278 gives an instruction to the wireless communication device 225 at the time of initial setting, and causes an output power to be lowered. For example, the resistance value of the variable resistance 225b is increased to lower the output power. In addition, in response to the end of the initial setting, the initial setting unit 278 instructs the wireless communication device 225 to restore the resistance value of the variable resistance 225b to the original value.

In addition, according to the present embodiment, after the authentication source information 281 and the authentication code generation algorithm 282 are shared, user authentication may be performed by using a manner in any of the first embodiment and the second embodiment.

Note that it may be configured such that at the time of an initial process, the authentication source information 281 and the authentication code generation algorithm 282 are encrypted by using a public key, and the encrypted authentication source information 281 and authentication code generation algorithm 282 are transmitted from the main body device 200 to the authentication device 300.

<Modifications>

Note that in each embodiment described above, except for the particular process in the modification of the third embodiment, functionalities for which authentication is performed by using the authentication device 300 are not particularly limited. For example, the user authentication process in each of the embodiments described above may be used for authentication performed at the time of unlocking a screen lock of the main body device 200 or may be used for authentication performed at the time of execution of a predetermined particular application.

<Modifications>

Figure 18:
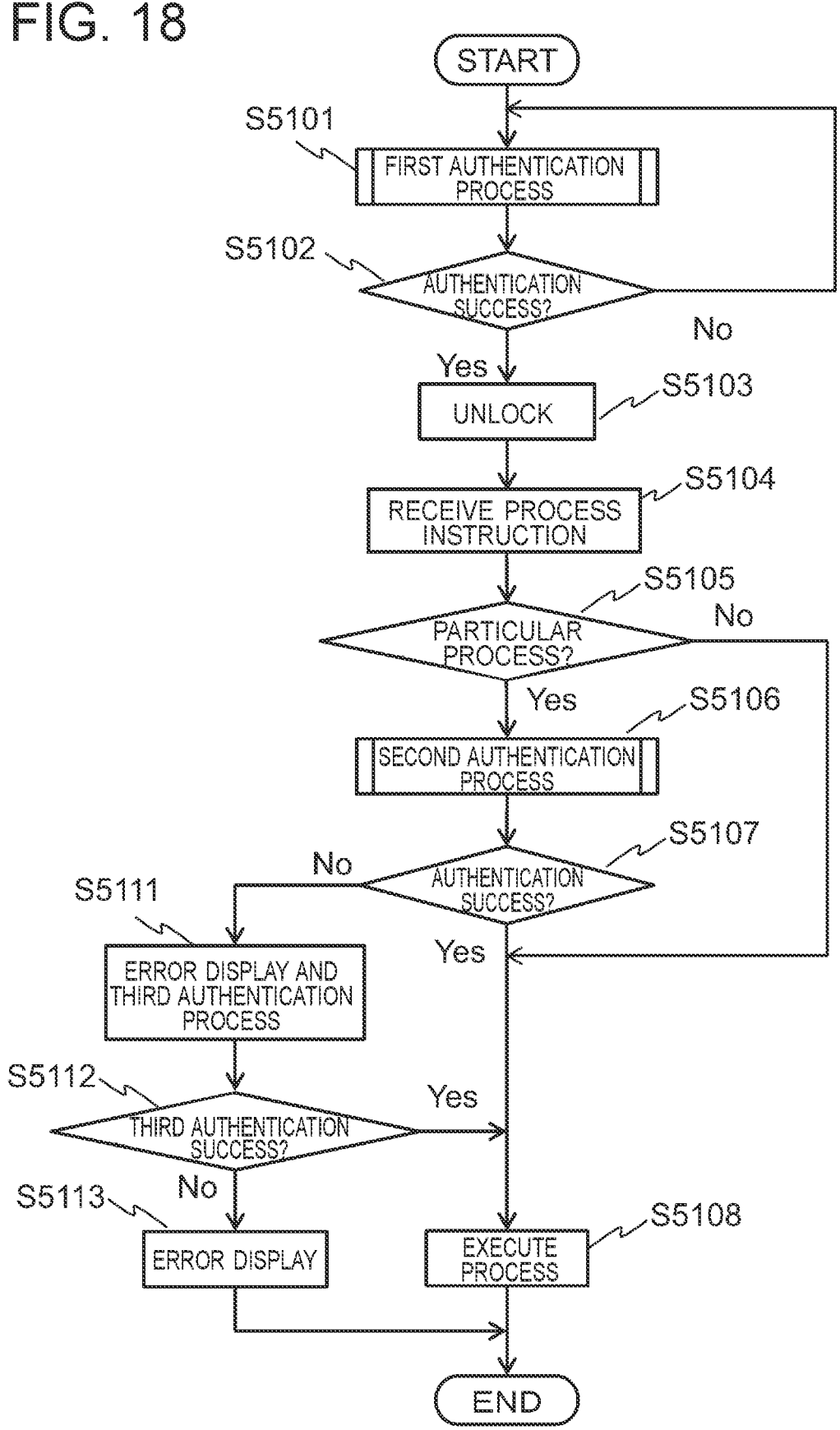
FIG. 18 is a flowchart of a user authentication process in a modification of the present invention.

In addition, for example, the main body device 200 may include a plurality of user authentication means, and may be configured to use them in combination. One example of the flow of a process in this case is illustrated in FIG. 18. In an example explained here, a screen lock is unlocked at a first authentication process, authentication for a particular process is performed at a second authentication process, and if the second authentication process failed, a third authentication process is performed as a backup. Note that the state where the screen is locked is the stand-by state of the main body device 200, and is a state where the main body device 200 does not accept operation other than operation for authentication.

First, the operation control unit 275 performs the first authentication process (Step S5101), and if the authentication is successful (Step S5102), the unlocking unit 273 unlocks the screen lock of the main body device 200 (Step S5103). Note that if the authentication failed, the process ends without further authentication or the flow returns to Step S5101, and the authentication is performed again.

After the screen lock is unlocked, in response to reception of an operation instruction from a user via the display 241 (Step S5104), the operation control unit 275 judges whether or not the instruction is for a predetermined particular process (Step S5105). At this time, if the instruction is for the particular process, the operation control unit 275 performs the second authentication process (Step S5106). On the other hand, if the process is not for the particular process, the process is executed without further authentication (Step S5108), and ended.

If the second authentication is successful (Step S5107), the flow proceeds to Step S5108, and the process is executed.

On the other hand, if the second authentication failed, the operation control unit 275 displays, on the display 241, a notification of the error, and also a notification prompting to perform the third authentication (Step S5111). Then, if authentication is established in this third authentication (Step S5112; Yes), the flow proceeds to Step S5108, and the process is executed. On the other hand, if authentication is not successful even in this third authentication (Step S5112; No), the operation control unit 275 displays a notification of the error (Step S5113), and ends the process.

Note that in the present modification, the first authentication, the second authentication, and the third authentication use different authentication means from each other. At this time, user authentication by using the authentication device 300 described above may be used for any of the first authentication, the second authentication, and the third authentication.

For example, authentication by directly using bioinformation such as fingerprints, veins, and irises may be applied to the first authentication, user authentication by using the authentication device 300 in each embodiment described above may be applied to the second authentication, and authentication means like an input of a PIN code (password) or the like may be applied to the third authentication.

For example, in the case of the modification of the third embodiment explained with reference to FIG. 14, if a user tries to perform a settlement process at a location other than the store where the user is a regular customer, authentication fails, and the lock is not unlocked. In such a case, as illustrated in this drawing, by preparing the third authentication to be used when authentication by using the user authentication means in the present embodiment failed, the settlement process can be performed even at a new store as long as the user knows a password. That is, the convenience and the safety can be attained in a well-balanced manner.

In addition, it may be configured such that the user can set the type of authentication means to be used for each of the first authentication, the second authentication, and the third authentication.

In addition, if the main body device 200 can use a plurality of authentication means, it may be configured such that multiple types of authentication are executed for a particular process. Then, it may be configured such that only if authentication is successful in all the types of authentication executed, the process is executed. In addition, it may be configured such that if at least one type of authentication is successful among the multiple types of authentication executed, the process is executed.

In addition, the particular process which is executed only if all the types of authentication using a plurality of authentication means are successful is a settlement process and the like, for example. In addition, the number of types of authentication may be changed depending on the settlement amount in the settlement process. That is, as the settlement amount increases, the number of authentication means to be used is increased as well.

<Modifications>

Figure 19:
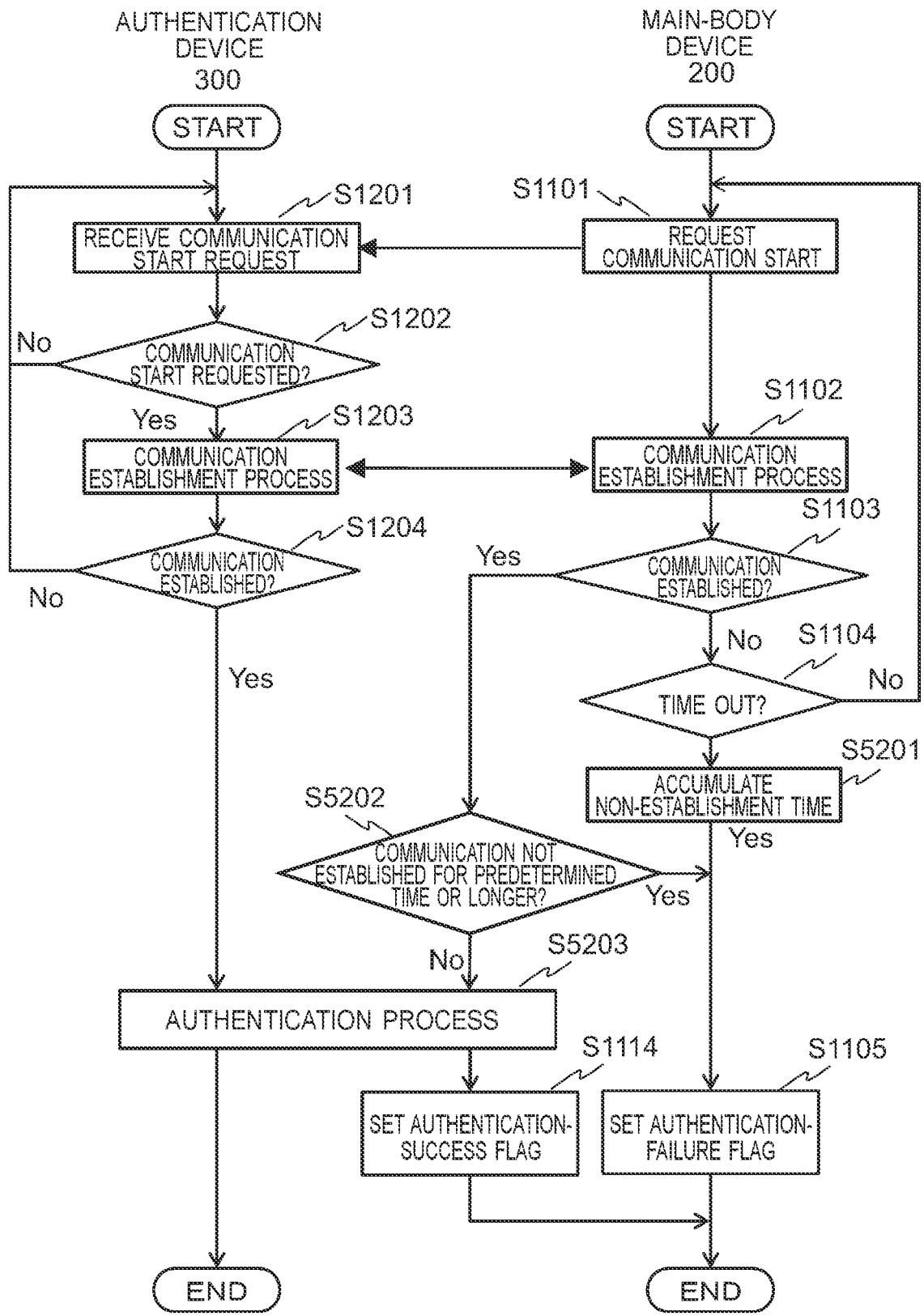
FIG. 19 is a flowchart of a user authentication process in another modification of the present invention.

Furthermore, it may be attempted to perform a communication establishment process regularly between the main body device 200 and the authentication device 300. The operation control unit 275 attempts to perform the communication establishment process starting from Step S1101 regularly, as illustrated in FIG. 19. Then, if establishment of communication failed, not only an authentication failure flag is set, but also the time at which communication could not be established is recorded (Step S5201; accumulation of non-establishment time).

Even if communication is established at Step S1103, the verification unit 272 checks past communication non-establishment periods before generating an authentication code transmission request (Step S5202). At this time, for example, it is judged whether or not there are consecutive periods during which communication was not established for a predetermined period.

If there are consecutive communication non-establishment periods for a predetermined period or longer, it is judged that authentication failed even if communication is established, and the flow proceeds to Step S1105. On the other hand, if the communication non-establishment periods are equal to or shorter than the predetermined length of time at Step S5202, the user authentication process of each of the embodiments described above is performed without checking other conditions (Step S5203).

<Modifications>

Although the authentication device 300 is used as an auxiliary authentication apparatus for the main body device 200 in each of the embodiments described above, this is not the sole example. For example, the authentication device 300 may also be provided with functionalities similar to those of the main body device 200. Then, it may be configured such that authentication is performed mutually between the main body device 200 and the authentication device 300.

For example, if the two apparatuses are a smartphone and a wearable terminal, when the smartphone executes a particular process, the smartphone functions as the main body device 200, and the wearable terminal functions as the authentication device 300. In addition, when the wearable terminal executes a particular process, the wearable terminal functions as the main body device 200, and the smartphone functions as the authentication device 300.

<Modifications>

In addition, although in the example explained in each of the embodiments described above, one authentication device 300 is provided for one main body device 200, this is not the sole example. A plurality of authentication devices 300 may be provided for one main body device 200. In this case, the plurality of authentication devices 300 each include the authentication source information 281 and/or the authentication code generation algorithm 282 provided to the main body device 200. Then, it may be configured such that authentication is successful only when authentication codes from all the authentication devices 300 match. On the other hand, it may be configured such that authentication is successful only when an authentication code from at least one authentication device 300 matches.

Note that the present invention is not limited to the embodiments described above but includes various modifications. For example, the embodiments described above are explained in detail in order to explain the present invention in an easy-to-understand manner, and embodiments are not necessarily limited to the ones including all the configurations that are explained. In addition, some of the configurations of an embodiment can be replaced with configurations of another embodiment, and configurations of an embodiment can be added to the configurations of another embodiment. In addition, some of the configurations of each embodiment can be subjected to addition, deletion, and replacement of other configurations.

In addition, each configuration, functionality, processing unit, processing means, and the like described above may be partially or entirely realized by hardware, for example, by designing it in an integrated circuit or by other means. In addition, each configuration, functionality, and the like described above may be realized by software by a processor interpreting and executing a program to realize each functionality. Information such as a program, a table, and a file to realize each functionality can be placed in a recording apparatus such as a memory, a hard disk, and an SSD (Solid State Drive), or a recording medium such as an IC card, an SD card, and a DVD.

In addition, control lines and information lines illustrated are only ones that are deemed to be necessary for the explanations, and all control lines and information lines that are required for a product are not necessarily illustrated. In fact, it may be considered that almost all configurations are connected to each other.

REFERENCE SIGNS LIST

100 . . . user authentication system,
200 . . . main body device,
201 . . . CPU,
202 . . . system bus,
210 . . . storage apparatus,
211 . . . ROM,
212 . . . RAM,
213 . . . storage,
220 . . . communication processing device,
221 . . . LAN communication device,
222 . . . telephone network communication device,
223 . . . wired communication device,
224 . . . proximity wireless communication device,
225 . . . wireless communication device,
225a . . . signal processing device,
225b . . . variable resistance,
225c . . . output device,
225d . . . antenna,
227 . . . expansion I/F,
230 . . . operation device,
240 . . . video processor,
241 . . . display,
242 . . . image signal processor,
243 . . . camera,
250 . . . audio processor,
251 . . . speaker,
252 . . . audio signal processor,
253 . . . microphone,
260 . . . sensor,
261 . . . GPS receiving device, 262 ... gyro sensor,
263 ... geomagnetic sensor,
264 ... acceleration sensor,
265 ... illuminance sensor,
266 ... proximity sensor,
267 ... bioinformation sensor,
271 ... authentication code transmission request generating unit,
272 ... verification unit,
273 ... unlocking unit,
274 ... transmitting/receiving unit,
275 ... operation control unit,
277 ... position information acquiring unit,
278 ... initial setting unit,
280 ... reference information,
281 ... authentication source information,
281a ... address,
281b ... code 1,
281c ... code 2,
281d ... code 3,
282 ... authentication code generation algorithm,
283 ... transmission request generation algorithm,
284 ... activity history,
284a ... time,
284b ... position information,
284c ... position information,
284d ... authentication success count,
285 ... authentication code transmission request,
286 ... authentication code,
291 ... execution program,
292 ... temporary storage area,
300 ... authentication device,
301 ... CPU,
302 ... system bus,
310 ... storage apparatus,
311 ... ROM,
312 ... RAM,
313 ... storage,
320 ... communication processing device,
323 ... wired communication device,
324 ... proximity wireless communication device,
325 ... wireless communication device,
361 ... GPS receiving device,
367 ... bioinformation sensor,
371 ... authentication code generating unit,
372 ... transmitting/receiving unit,
373 ... biometric authenticating unit,
374 ... position information acquiring unit,
375 ... initial setting unit,
380 ... reference information,
383 ... verification bioinformation,
384 ... activity history,
391 ... execution program,
392 ... temporary storage area

The invention claimed is:

1. A portable terminal comprising:
communication circuitry configured to communicate with a device;
a processor configured to:
generate a first authentication code transmission request including a first value selected for each instance of transmission;
transmit the first authentication code transmission request to the device via the communication circuitry;
receive, via the communication circuitry, a first authentication code, wherein the device transmits the first authentication code to the portable terminal in response to receiving the first authentication code transmission request;
determine that first authentication is successful based on the first authentication code;
execute a predetermined functionality in response to determining that the first authentication is successful;
receive, via the communication circuitry, a second authentication code transmission request including a second value transmitted from the device;
generate a second authentication code in response to receiving the second value; and
transmit the second authentication code as a reply to the device via the communication circuitry;
a storage; and
a position detector,
wherein the processor is further configured to acquire a position of the portable terminal from the position detector and store position information on the position into the storage in association with a period,
wherein the first value indicates a first predetermined past period during which the position of the portable terminal has been acquired and stored into the storage; and the first authentication code is position information of the device, and
wherein the second value indicates a second predetermined past period; and the second authentication code is the position information of the portable terminal stored in the storage in association with the second predetermined past period.

2. The portable terminal according to claim 1,
wherein, when executing the predetermined functionality, the processor is further configured to:
control the position detector to detect a first position of the portable terminal;
record first position information on the first position associated with the predetermined functionality to the storage; and
generate the first authentication code transmission request including the first position information as the first value and transmit the first authentication code transmission request to the device via the communication circuitry, and
wherein, after receiving the second authentication code transmission request, the processor is further configured to:
acquire a second position of the device from the second value included in the second authentication code transmission request; and
generate the second authentication code.

3. The portable terminal according to claim 2, wherein the position detector is GPS signal receiver, Wi-Fi communication circuitry, mobile network communication circuitry, or combination thereof.

4. The portable terminal according to claim 1, wherein the predetermined functionality is a settlement functionality.

5. The portable terminal according to claim 1, wherein the processor is further configured to:
execute second authentication different from the first authentication using the first authentication code; and
generate the first authentication code transmission request after the second authentication is successful.

6. The portable terminal according to claim 5, wherein the second authentication is fingerprint authentication.

7. The portable terminal according to claim 1, wherein the processor is further configured to execute second authentication different from the first authentication using the first authentication code in response to determining that the first authentication using the first authentication code is not successful.

8. The portable terminal according to claim 7, wherein the second authentication is fingerprint authentication.

9. The portable terminal according to claim 1,
wherein the portable terminal is configured to accumulate non-establishment periods during which the communication circuitry has not been able to establish communication with the device, and
wherein the processor is further configured not to generate the first authentication code transmission request in response to determining that the accumulated non-establishment periods exceed a predetermined period.

10. The portable terminal according to claim 1, wherein the portable terminal is a smartphone.

11. A method for controlling a portable terminal including communication circuitry configured to communicate with a device, the method comprising:
generating a first authentication code transmission request including a first value selected for each instance of transmission;
transmitting the first authentication code transmission request to the device via the communication circuitry;
receiving, via the communication circuitry, a first authentication code, wherein the device transmits the first authentication code to the portable terminal in response to receiving the first authentication code transmission request;
determining that first authentication is successful based on the first authentication code;
executing a predetermined functionality in response to determining that the first authentication is successful;
receiving, via the communication circuitry, a second authentication code transmission request including a second value transmitted from the device;
generating a second authentication code in response to receiving the second value; and
transmitting the second authentication code as a reply to the device via the communication circuitry,
wherein the portable terminal includes a storage; and a position detector,
wherein the method further comprises acquiring a position of the portable terminal through the position detector and store position information on the position into the storage in association with a period,
wherein the first value indicates a first predetermined past period during which the position of the portable terminal has been acquired and stored into the storage; and the first authentication code is the position information of the device, and
wherein the second value indicates a second predetermined past period; and the second authentication code is position information of the portable terminal stored in the storage in association with the second predetermined past period.

12. The method according to claim 11,
wherein method further comprises:
when executing the predetermined functionality, controlling the position detector to detect a first position of the portable terminal; recording first position information on the first position associated with the predetermined functionality to the storage; and generating the first authentication code transmission request including the first position information as the first value and transmit the first authentication code transmission request to the device via the communication circuitry, and
after receiving the second authentication code transmission request, acquiring a second position of the device from the second value included in the second authentication code transmission request; and generating the second authentication code.

13. The method according to claim 12, wherein the position detector is GPS signal receiver, Wi-Fi communication circuitry, mobile network communication circuitry, or combination thereof.

14. The method according to claim 11, wherein the predetermined functionality is a settlement functionality.

15. The method according to claim 11, further comprising:
executing second authentication different from the first authentication using the first authentication code; and
generating the first authentication code transmission request after the second authentication is successful.

16. The method according to claim 11, further comprising executing second authentication different from the first authentication using the first authentication code in response to determining that the first authentication using the first authentication code is not successful.

17. The method according to claim 11,
wherein the portable terminal is configured to accumulate non-establishment periods during which the communication circuitry has not been able to establish communication with the device, and
wherein the method further comprises not generating the first authentication code transmission request in response to determining that the accumulated non-establishment periods exceed a predetermined period.

18. The method according to claim 11, wherein the portable terminal is a smartphone.

* * * * *